US010313046B2

(12) United States Patent
Magri et al.

(10) Patent No.: US 10,313,046 B2
(45) Date of Patent: Jun. 4, 2019

(54) VERIFYING CONFIGURATION IN WAVELENGTH SELECTIVE SWITCHING NODE

(71) Applicant: Telefonaktiebolaget LM Ericsson (publ), Stockholm (SE)

(72) Inventors: Roberto Magri, Pisa (IT); Matteo Constantini, Genoa (IT)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 15/577,392

(22) PCT Filed: Jun. 17, 2015

(86) PCT No.: PCT/EP2015/063643
§ 371 (c)(1),
(2) Date: Nov. 28, 2017

(87) PCT Pub. No.: WO2016/202389
PCT Pub. Date: Dec. 22, 2016

(65) Prior Publication Data
US 2018/0175962 A1    Jun. 21, 2018

(51) Int. Cl.
*H04J 14/02* (2006.01)
*H04B 10/07* (2013.01)
*H04Q 11/00* (2006.01)
(52) U.S. Cl.
CPC .......... *H04J 14/0212* (2013.01); *H04B 10/07* (2013.01); *H04J 14/0217* (2013.01); *H04J 14/0221* (2013.01); *H04Q 11/0005* (2013.01)

(58) Field of Classification Search
CPC ............................. H04B 10/07–10/0793; H04J 14/0201–14/0221
(Continued)

(56) References Cited

U.S. PATENT DOCUMENTS 6,559,984 B1 * 5/2003 Lee .................... H04B 10/0771
398/5
6,600,581 B1 * 7/2003 Fatehi ................ H04Q 11/0005
398/9
(Continued)

FOREIGN PATENT DOCUMENTS

| EP | 1081982 A2 | 3/2001 |
| EP | 2469745 A1 | 6/2012 |
| WO | 2010036264 A1 | 4/2010 |

*Primary Examiner* — Li Liu
(74) *Attorney, Agent, or Firm* — Patent Portfolio Builders, PLLC

(57) ABSTRACT

Verifying a configuration of reconfigurable internal optical paths (970) in a wavelength selective optical switching WSS node (62) involves identifying which of several WSS subsystems (920, 950, 960) is coupled upstream of a first internal optical path based on detecting optical power distinctive of the upstream subsystem and carried to the downstream WSS subsystem. The detecting can be of a power of wavelengths used for traffic (110), or a power of optical noise when there is no traffic (120). A record is made of the identified configuration. The automated verification can be carried out without the conventional dedicated optical wavelengths or dedicated optical hardware for inserting such additional wavelengths dedicated to discovery, and without disrupting the traffic if upgrading a node. It can be controlled locally or by an NMS such as an SDN controller.

20 Claims, 21 Drawing Sheets

(58) Field of Classification Search
USPC ...... 398/25, 33, 34, 45–57, 82, 83, 173–177
See application file for complete search history.

(56) References Cited

U.S. PATENT DOCUMENTS

| | | | | |
|---|---|---|---|---|
| 2007/0183777 | A1* | 8/2007 | Peloso | H04Q 11/0005 |
| | | | | 398/45 |
| 2009/0034965 | A1* | 2/2009 | Look | H04B 10/0731 |
| | | | | 398/19 |
| 2012/0328239 | A1* | 12/2012 | Fuerst | H04J 14/0212 |
| | | | | 385/20 |
| 2013/0039647 | A1* | 2/2013 | Yamashita | H04B 10/0771 |
| | | | | 398/17 |
| 2016/0099851 | A1* | 4/2016 | Archambault | H04J 14/0212 |
| | | | | 398/16 |
| 2016/0315701 | A1* | 10/2016 | Yuki | H04J 14/0221 |

\* cited by examiner

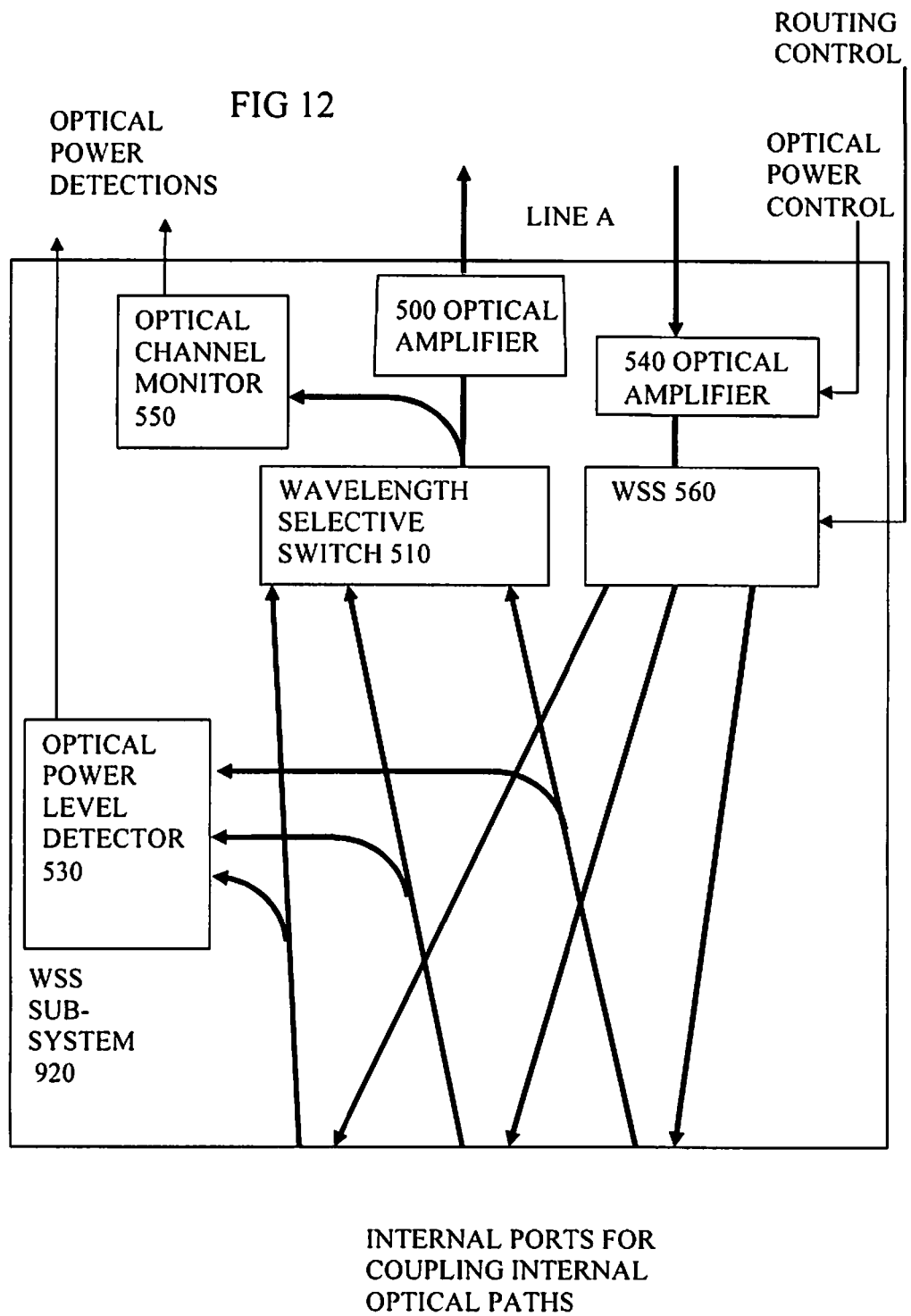

FIG 13

85 CONTROLLING THE UPSTREAM WSS SUBSYSTEM TO OUTPUT NOISE, AND ROUTING THE OUTPUT FROM DIFFERENT ONES IN TURN OF ITS INTERNAL PORTS

102 IDENTIFYING WHICH OF THE WSS SUBSYSTEMS IS COUPLED UPSTREAM OF THE FIRST INTERNAL OPTICAL PATH BASED ON DETECTING OPTICAL POWER DISTINCTIVE OF THE UPSTREAM WSS SUBSYSTEM AT DIFFERENT ONES IN TURN OF THE INTERNAL PORTS OF THE DOWNSTREAM SUBSYSTEM

120 THE IDENTIFYING BEING BASED ON DETECTING A POWER OF OPTICAL NOISE WHEN THERE IS NO TRAFFIC

130 MAKING A RECORD OF THE IDENTIFIED CONFIGURATION OF WHICH OF THE INTERNAL PORTS OF THE DOWNSTREAM WSS SUBSYSTEM IS COUPLED TO THE IDENTIFIED UPSTREAM WSS SUBSYSTEM.

FIG 20

---
705 APPARATUS FOR VERIFYING CONFIGURATION OF RECONFIGURABLE INTERNAL PATHS

> 740 MODULE FOR IDENTIFYING WHICH OF THE SUBSYSTEMS IS COUPLED UPSTREAM OF THE FIRST INTERNAL OPTICAL PATH AND WHICH OF THE INTERNAL PORTS OF THE DOWNSTREAM SUBSYSTEM IS COUPLED, BASED ON DETECTING OPTICAL POWER DISTINCTIVE OF THE UPSTREAM SUBSYSTEM AND CARRIED TO THE DOWNSTREAM SUBSYSTEM, THE DETECTING COMPRISING AT LEAST ONE OF: DETECTING A POWER OF WAVELENGTHS USED FOR TRAFFIC, AND DETECTING A POWER OF OPTICAL NOISE WHEN THERE IS NO TRAFFIC,

> 750 MODULE FOR MAKING A RECORD OF THE IDENTIFIED CONFIGURATION OF WHICH OF THE INTERNAL PORTS OF THE DOWNSTREAM SUBSYSTEM IS COUPLED TO THE IDENTIFIED UPSTREAM SUBSYSTEM.

---

RECORD OF THE IDENTIFIED CONFIGURATION

DETECTION FROM DOWNSTREAM WSS SUBSYSTEM

VERIFYING CONFIGURATION IN WAVELENGTH SELECTIVE SWITCHING NODE

TECHNICAL FIELD

The present invention relates to methods of verifying configuration of internal optical paths in a wavelength selective switching node, and to corresponding apparatus, controllers, network management systems and computer programs.

BACKGROUND

It is known to provide wavelength selective switching in optical networks using a network element called ROADM (Reconfigurable Optical Add/Drop multiplexer). ROADMs are currently the fundamental blocks to build optical meshed networks and are becoming widely deployed in the core and metro/core segments. The increase in IP traffic is pushing a reduction in network layers leading to the IP/DWDM paradigm where the photonic infrastructure is directly connected to the IP/router layer. Therefore ROADM nodes are becoming part of the IP/DWDM solution and are going to be deployed to provide photonic switching to the IP layer enabling efficient multilayer switching.

It has been proposed to auto-discover optical system topology using tone signals to trace wavelengths through the network, or using a low-level wavelength-tunable monitor signal to probe the system. These tend to add complexity to transmitter design or are limited to discovering topology of lines between nodes rather than connections internal to nodes. It is also known to have nodes configured to transmit and receive a topology wavelength both external to the node and to one or more components in the node, wherein the topology wavelength is dedicated to providing topology discovery. Again this adds hardware and so adds complexity and costs, which increase as the ROADMs have more internal connections. Current ROADMs can have a large number (called degree) of interconnected subsystems (9-degree ROADMs are widely deployed and 20-degree ROADMs are already available) and can have a variety of functionalities (for example directionless, colorless, etc). When nodes are installed or upgraded, they may have complex commissioning and configuration procedures where mistakes can lead to wrong network operations.

SUMMARY

Embodiments of the invention provide improved methods and apparatus. According to a first aspect of the invention, there is provided a method of verifying a configuration of reconfigurable internal optical paths in a wavelength selective optical switching node having at least two wavelength selective switching (WSS) subsystems, at least two of the subsystems having an external interface and at least two of the subsystems having at least two internal ports. A first of the reconfigurable internal optical paths is coupled to carry traffic from an internal port of one of the subsystems upstream of the first internal optical path to an internal port of one of the subsystems downstream of the first internal optical path. The method involves identifying which of the subsystems is coupled upstream of the first internal optical path and which of the internal ports of the downstream subsystem is coupled, based on detecting optical power distinctive of the upstream subsystem and carried to the downstream subsystem. The detecting can be detecting a power of wavelengths used for traffic, or detecting a power of optical noise when there is no traffic. The method also involves making a record of the identified configuration of which of the internal ports of the downstream subsystem is coupled to the identified upstream subsystem. By identifying based on optical power distinctive of the upstream subsystem in the form of power of wavelengths also used for traffic or optical noise when there is no traffic, the automated verification of the configuration can be carried out without the conventional dedicated optical wavelengths or dedicated optical hardware for inserting such additional wavelengths dedicated to discovery. Also the verification can be carried out without disrupting the traffic. Hence the actual configuration can be verified automatically in existing nodes as well as new nodes, and when existing nodes are upgraded with additional WSS subsystems. Also as nodes are scaled up to have more such WSS subsystems, the costs of such auto discovery do not increase as much compared to the conventional case using dedicated optical hardware. It is applicable to SDN or other types of network.

Any additional features can be added or disclaimed. Some such additional features are set out in dependent claim and described in more detail below. One such additional feature is the identifying step being based on detecting the power of wavelengths also used for traffic.

Another such additional feature is the identifying step being based on detecting the power of wavelengths by at least one of: detecting a distinctive pattern of which wavelengths are in use, and detecting a distinctive optical power modulation applied to enable the verification. These are some particular ways of detecting the distinctive optical power without needing additional dedicated hardware. Notably they can be carried out when the upstream subsystem is in use for carrying traffic. Thus it can be used when upgrading existing nodes, as well as for installation of new nodes.

Another such additional feature is the identifying step being based on detecting the distinctive optical power in the form of optical noise when there is no traffic, at a time when no such noise is being output from others of the subsystems. These are some particular ways of providing the distinctive optical power without needing additional dedicated hardware when the upstream subsystem is not in use for carrying traffic.

Another such additional feature is the node having internal optical paths in both directions between the upstream and downstream WSS subsystems, and the identifying step being based on detecting the distinctive optical power carried by the internal optical path in one direction by detecting a power of wavelengths used for traffic, and in the other direction based on detecting the distinctive optical power carried by detecting a power of optical noise when there is no traffic. This combination of verifications of internal optical paths in both directions is particularly useful when adding a new WSS subsystem to an existing node having other WSS subsystems already carrying traffic for example.

Another such additional feature is the upstream subsystem being configured to broadcast the distinctive optical power to more than one of its internal ports, and the identifying step being based on detecting at different ones of the internal ports of the downstream subsystem. This enables use with broadcast and select type wavelength selective switches which are widely used.

Another such additional feature is the upstream subsystem being configured to route the distinctive optical power to different ones in turn of its internal ports for respective defined periods. This enables use with route and select type wavelength selective switches, which are becoming more widely used. Another such additional feature is the identifying step comprising comparing the detected distinctive optical power to a known optical power output by the upstream subsystem.

Another such additional feature is a further step of detecting ambiguity in the detecting, and carrying out a disambiguating step by causing an unambiguous optical power to be output from the upstream subsystem over the respective one of the internal optical paths. This can help make the verification more complete or more accurate. Another such additional feature is a step of controlling nodes upstream of the upstream subsystem to route a temporarily unused wavelength to the downstream subsystem to provide additional distinctiveness of the optical power.

Another such additional feature is controlling an optical amplifier at the upstream subsystem to provide the distinctive optical power without providing an additional dedicated optical wavelength. This is one way of avoiding the need for additional optical hardware for providing the identifiable optical signal.

Another such additional feature is using the detected configuration to identify an incorrect configuration. Another such additional feature is the method being carried out controlled by a network management system. This can more efficient than controlling the verification locally at the node as the network management system may have useful information on the traffic and the desired configuration.

Another aspect provides apparatus for verifying a configuration of reconfigurable internal optical paths in a wavelength selective optical switching node, the node having at least two wavelength selective switching subsystems, at least two of the subsystems having an external interface and at least two of the subsystems having at least two internal ports, a first of the reconfigurable internal optical paths being coupled to carry traffic from an internal port of one of the subsystems upstream of the first internal optical path to an internal port of one of the subsystems downstream of the first internal optical path. The apparatus can have a processing circuit and a memory circuit, the memory circuit having instructions executable by the processor circuit, to identify which of the subsystems is coupled upstream of the first internal optical path and which of the internal ports of the downstream subsystem is coupled, based on detecting optical power distinctive of the upstream subsystem and carried to the downstream subsystem, the detecting comprising at least one of: detecting a power of wavelengths used for traffic, and detecting a power of optical noise when there is no traffic. A record is made of the identified configuration of which of the internal ports of the downstream subsystem is coupled to the identified upstream subsystem.

Any additional feature may be added or disclaimed and one such additional feature is the processing circuit being configured to identify based on detecting the power of wavelengths also used for traffic, by at least one of: using an optical channel monitor to detect the pattern as a pattern of which wavelengths are in use, and using an optical power detector to detect the pattern as a pattern of optical power modulation applied to enable the verification. Another such additional feature is, for a node having internal optical paths in both directions between the upstream and downstream WSS subsystems, the processing circuit being configured to identify based on detecting the distinctive optical power carried by the internal optical path in one direction by detecting a power of wavelengths used for traffic. In the other direction it is based on detecting the distinctive optical power by detecting a power of optical noise when there is no traffic.

Another such additional feature is the upstream subsystem being configured to broadcast the distinctive optical power to more than one of its internal ports, and the processing circuit being configured to identify based on detecting at different ones of the internal ports of the downstream subsystem. Another such additional feature is the processing circuit being configured to control nodes upstream of the upstream subsystem to route the distinctive optical power to different ones in turn of its internal ports for respective defined periods.

Another such additional feature is the processing circuit also being configured to, in the case of ambiguity in the detecting, carry out a disambiguation by controlling the upstream subsystem to output an unambiguous distinctive optical power over the respective one of the internal optical paths. Another such additional feature is the processing circuit being configured to compare the detected distinctive optical power to a known optical power output by the upstream subsystem.

Another aspect provides a network management system comprising the apparatus of any of the above sets of features. Another aspect provides a controller for a node comprising the apparatus of any of the above sets of features.

Another aspect provides a computer program configured to, when run on a computer, perform a method corresponding to any of the above sets of features. The computer program can be stored on a computer readable material. Any of the additional features can be combined together and combined with any of the aspects. Other effects and consequences will be apparent to those skilled in the art, especially over compared to other prior art. Numerous variations and modifications can be made without departing from the claims of the present invention.

BRIEF DESCRIPTION OF THE DRAWINGS

How the present invention may be put into effect will now be described by way of example with reference to the appended drawings, in which:

FIG. 8 shows steps of an embodiment identifying connections from upstream WSS subsystems already in use, FIG. 9 shows steps of an embodiment identifying connections to other WSS subsystems not yet in use, FIGS. 12 to 14 show embodiments for use where the WSS subsystems have a Route and Select architecture, FIGS. 19 and 20 show schematic views of apparatus for verifying configuration according to embodiments.

DETAILED DESCRIPTION

Figure 1:
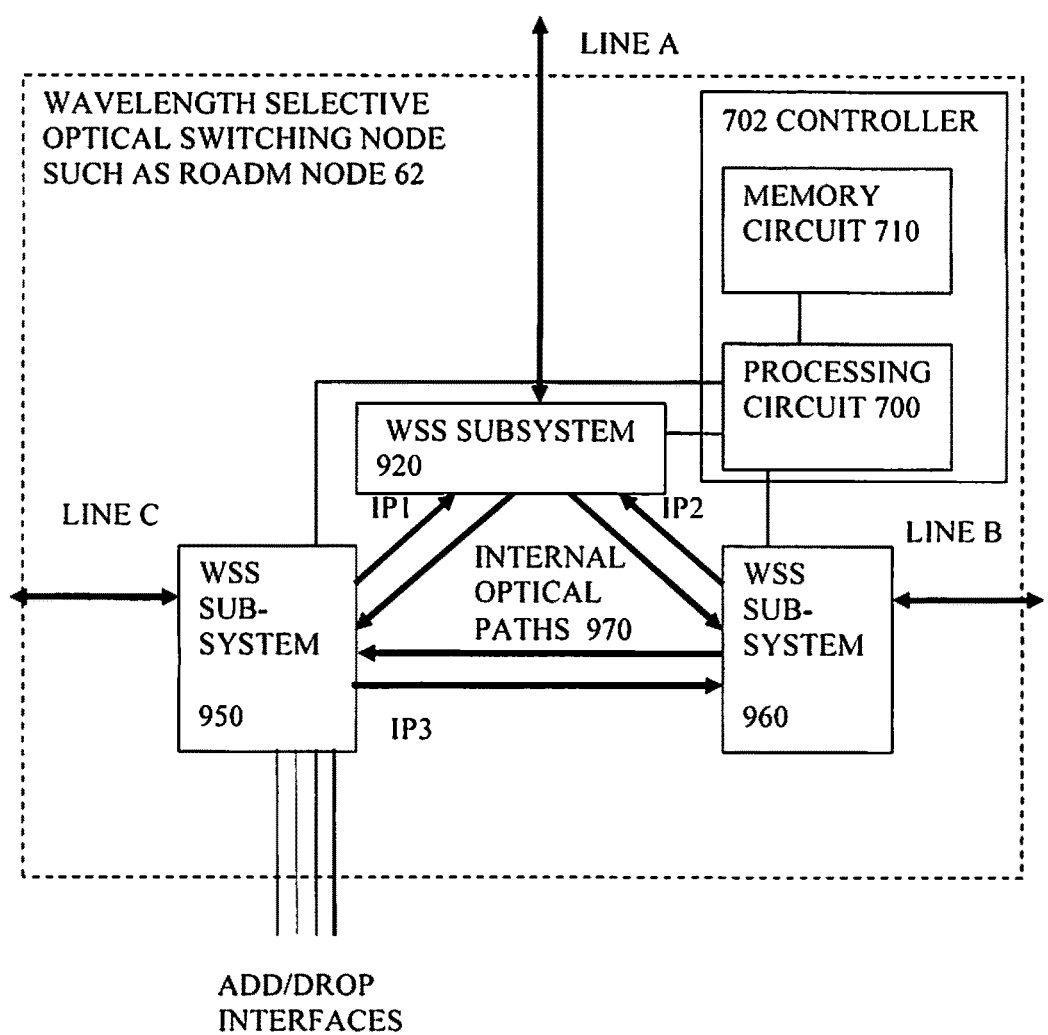
FIG. 1 shows a node view according to an embodiment showing WSS subsystems and internal optical paths.

The present invention will be described with respect to particular embodiments and with reference to certain drawings but the scope of the invention is not limited thereto. The drawings described are only schematic and are non-limiting. In the drawings, the size of some of the elements may be exaggerated and not drawn to scale for illustrative purposes.
Definitions:

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

References to software can encompass any type of programs in any language executable directly or indirectly on processing hardware.

References to processors, hardware, processing circuits or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example. References to a module are intended to encompass modules comprising hardware, software, processing circuits, memories and so on, and can be integrated in any amount.

References to an external interface are intended to encompass a local add/drop interface as well as a line interface coupled to other nodes.

References to reconfigurable internal optical paths are intended to encompass those being reconfigurable in any way, by unplugging or switching manually, by remote control or any automated control for example.

References to traffic are intended to encompass any kind of traffic whether payloads of paid-for traffic, or dummy or test or duplicated traffic or redundant traffic for example.

References to internal ports are intended to encompass any kind of port, typically having two directions, inward and outward, with separate connectors for each direction for example, but including other conceivable examples such as a single connector carrying a bidirectional optical path, or an example having a single direction.

References to internal optical paths are intended to encompass any type of such paths including patch cords, integrated optical paths, fixed fibers or other waveguides for example, typically with separate physical paths for each direction of the traffic, but including other conceivable examples such as a bidirectional optical path, or possibly a single path for providing only one direction of traffic.

References to wavelength selective switching subsystems are intended to encompass any kind of such subsystems having a wavelength selective switch or selector of any type, integrated to any level, with or without associated components such as optical amplifiers, detectors and controllers, with or without add drop paths, for use in one direction or two directions, for example.

References to upstream and downstream are intended to refer to location relative to a particular direction of traffic, so for bidirectional traffic a given WSS subsystem can be simultaneously an upstream subsystem and a downstream subsystem.

References to channels or wavelengths are not intended to be limited to fixed bandwidth channels and so can encompass variable portions of bandwidth for a flex-grid type network.

References to splitters are intended to encompass those broadcasting to all outward internal ports and other conceivable examples which broadcast to a subset of the outward internal ports.

Abbreviations:
ASE Amplified Spontaneous Emission (amplifier noise)
ASIC Application Specific Integrated Circuit
B&S Broadcast and Select ROADM architecture
IP/DWDM Internet Protocol/Dense Wave Division Multiplexed
FPGA Field Programmable Gate Array
LOS Loss of Signal
OPEX Operating Expenditure
OTDR Optical Time Domain Reflectometry
ROADM Reconfigurable Add/Drop Multiplexer
R&S Route and Select ROADM architecture
SDN Software Defined Network
WSS Wavelength Selective Switch
Introduction By way of introduction to the embodiments, some issues with conventional designs will be explained. As mentioned above, when nodes are installed or upgraded, they may have complex commissioning and configuration procedures where mistakes can lead to wrong network operations. This is especially true in the IP/DWDM context where the photonic layer is considered an external technology whose complexity needs to be hidden as much as possible. The embodiments described below can help address the problem of automatically verifying the configuration of reconfigurable internal optical paths also known as the port-degree interconnections.

The commissioning or upgrade of a ROADM node with a new WSS subsystem (degree) usually needs the installation of the new hardware such as a card or cards containing the WSS subsystem) and the connections of internal optical paths to all other ROADM units. The logical cross-connection between a specific internal port of the ROADM unit and the corresponding degree is manually set and needs to match with the cabling. This is a time-consuming process especially for the large degree ROADMs under deployment nowadays with each WSS subsystem providing 9 or even 20 ports. Furthermore a mismatch error between the logical SW configuration and actual cabling can lead to wrong network operation.

The common practice in current networks and systems is to make these configurations manually through a local interface or Element Manager interface. Control software nowadays is only able to set-up wavelength paths across a network by controlling the WSS settings assuming the configuration tables of logical interconnections are correctly configured.

If a dedicated topology discovery wavelength is used this involves additional optical hardware in the node to generate out-of-band monitoring wavelength and use this to probe the node ports and identify the connections. This is similar to using an embedded OTDR system where dedicated HW is used to probe the fiber status. This solution, besides being costly, is however not applicable to already deployed nodes and, requiring special HW, is unlikely to become available on the market by various suppliers.

FIG. 1, Node View

FIG. 1 shows a schematic view of some parts of a wavelength selective optical switching node 62 for an optical communications network suitable for embodiments. It shows three WSS subsystems 920, 950, 960, (there can be many more, or as few as two) interconnected by reconfigurable internal optical paths 970, IP1, IP2, IP3, between respective internal ports of the WSS subsystems. Each WSS subsystem has an external interface coupled to a line A, B, C, or to directionless add/drop lines. The switching by the WSS subsystems can be between the external interface and the internal ports or between different ones of the internal ports. The lines can be coupled to other nodes. Typically the lines are wavelength division multiplexed and the add drop interfaces can be wavelength division multiplexed or, conceivably, individual wavelengths. The operation of the WSS subsystems can be controlled by a controller 702 typically implemented by a processing circuit 700 fed by instructions stored in a memory circuit 710. Typically the internal optical paths carry wavelength division multiplexed signals, though examples where the internal optical paths carry individual wavelengths or subsets of the wavelengths can also be envisaged. The controller 702 can be an example of apparatus for verifying the configuration of the reconfigurable internal optical paths. Although shown as part of the node, the apparatus for verifying the configuration can in principle be located elsewhere and does not need to be incorporated with the node controller. The operation of the apparatus to verify the configuration can have features of any of the methods described in more detail below with reference to other figures.

A typical ROADM node can be colourless, meaning any wavelength can be switched to or from any add drop port, and directionless meaning there is no dependency or restrictions on which direction any wavelength can be sent. In principle, the features of the embodiments can equally be applied to other types of nodes having colour restrictions or direction restrictions at some or all of their WSS subsystems. In a typical example the WSS subsystems have an architecture based on the broadcast-and-select scheme where passive splitters are used on the receive side to broadcast the WDM signal incoming on the line to some or (typically) all of the outward internal ports. In the other direction within the subsystem a WSS is provided on the transmit side to select desired wavelengths from any of the ports and block unwanted ones from each inward internal port. The desired wavelengths are multiplexed together and output onto the line.

For this example each internal port has an outward part coupled from the splitter and an inward part coupled to the WSS, typically implemented by two connectors. By means of the internal optical paths, the WSS in one WSS subsystem can receive from the splitters in every other WSS subsystem. Thus for one direction of traffic the WSS can be regarded as being in a downstream subsystem, downstream of the internal optical path, and the splitters in the other subsystems can be regarded as being in upstream subsystems, upstream of the internal optical path. For the other direction of traffic, the designations of upstream and downstream are reversed. Hence each subsystem can be both an upstream subsystem and a downstream subsystem, depending on which direction of traffic is being considered. An alternative type of WSS subsystem uses a route-and-select architecture, with a WSS in place of the splitter, so that the required wavelengths in the optical input from the line are routed to a selected outward internal port rather than all wavelengths being broadcast from all outward internal ports.

Therefore in some cases many fiber connections for the internal optical paths need to be established and a table of which internal port is coupled to which other subsystem (also called their port correspondences, showing to which degree of the ROADM they are connected), needs to be verified and recorded for use in the management/control processes. This can be a time consuming and error-prone procedure.

Figure 2:
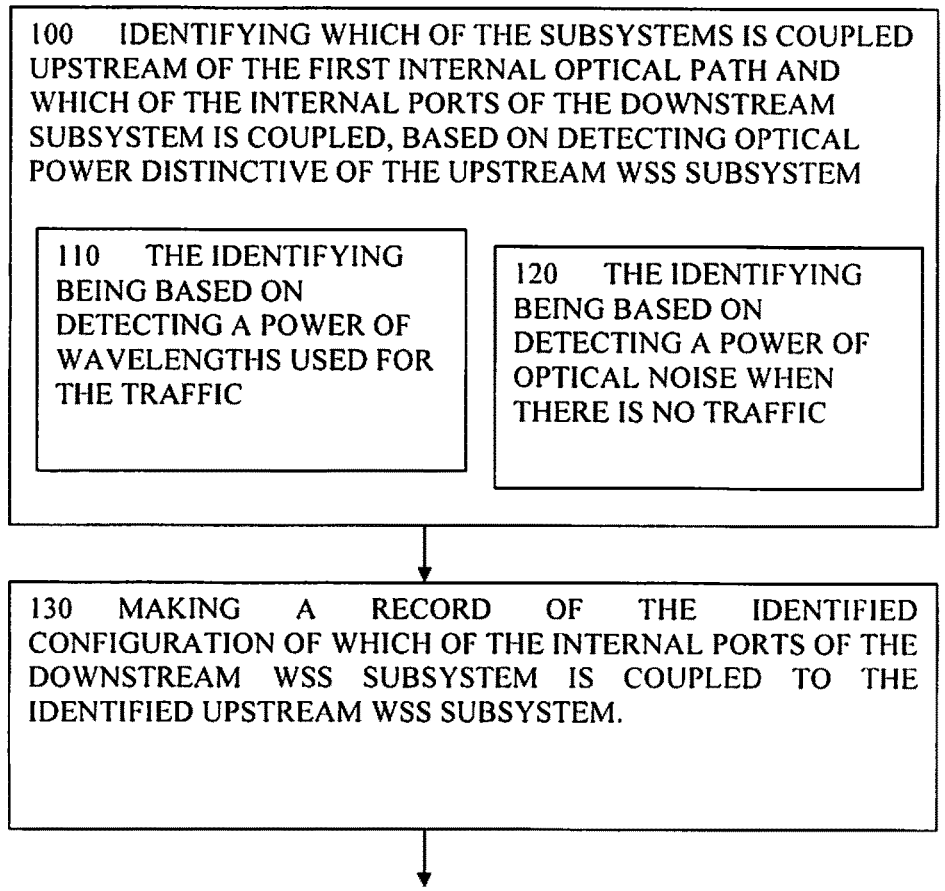
FIG. 2 shows steps of a verification method according to an embodiment.

FIG. 2, Verification Method According to an Embodiment

FIG. 2 shows steps of a first embodiment, for verifying the configuration of the internal optical paths in a node such as that of FIG. 1, or other types. The steps provide a method to automatically verify and record the configuration of all the internal ports interconnections of a multi-degree ROADM node by automatic detection of fiber connections. This can simplify the ROADM node commissioning and help avoid human errors. The method is based various ways of generating or detecting distinctive optical power to identify which WSS subsystem is connected, so as to avoid the need for additional hardware associated with a dedicated topology discovery wavelength.

Firstly there is detection of optical (typically ASE) noise coming from a newly added WSS subsystem. This can be done by switching on an RX amplifier of a new WSS subsystem and at all the other units, detecting the incoming optical noise power. This can enable identifying the correspondence (logical association) between the new WSS subsystem (also called degree) and the internal ports of the downstream WSS subsystems.

Secondly there is detection of distinctive optical power distinctive of the upstream WSS subsystem coming from in-service units. When optical power comes from already in service WSS subsystems, then optical noise is not used as other distinctive optical power is available, such as by recognizing the different channel patterns in the optical power coming from the various directions, or by detecting an optical power modulation imposed on the optical signal. Thus the correspondence (or association) of which of the internal ports of the new WSS subsystem is coupled to which of the other WSS subsystems upstream, can be achieved also for those WSS subsystems which are already in use.

As shown in FIG. 2, this embodiment has steps in verifying a configuration of reconfigurable internal optical paths in a wavelength selective optical switching node, for a node having at least two WSS subsystems, at least two of the subsystems having an external interface and at least two of the subsystems having at least two internal ports. A first of the reconfigurable internal optical paths is coupled to carry traffic from an internal port of one of the subsystems upstream of the first internal optical path to an internal port of one of the subsystems downstream of the first internal optical path. There is a step 100 of identifying which of the subsystems is coupled upstream of the first internal optical path and which of the internal ports of the downstream subsystem is coupled, based on detecting optical power distinctive of the upstream subsystem and carried to the downstream subsystem, the detecting comprising detecting the distinctive optical power by at least one of: detecting 110 a power of wavelengths used for traffic, and detecting 120 a power of optical noise when there is no traffic. At step 130 a record is made of the identified configuration of which of the internal ports of the downstream subsystem is coupled to the identified upstream subsystem. These steps can be carried out by a controller which can be located in various places in principle. It can be part of a network management system, or an element management part of the NMS, or a local controller at the node, or as part of a configuration system coupled to the node. The verified record of configuration can then be used as a configuration table for the critical task of controlling the WSS subsystems to route the wavelengths carrying traffic through the node to their desired destinations. It is vital that this configuration table must be correct to ensure correct routing of wavelengths by a node control part or by an NMS or SDN controller.

By identifying based on optical power distinctive of the upstream subsystem in the form of power of wavelengths also used for traffic or optical noise when there is no traffic, the automated verification of the configuration can be carried out without the conventional dedicated optical wavelengths or dedicated optical hardware for inserting such additional wavelengths dedicated to discovery. Also the verification can be carried out without disrupting the traffic. Hence the actual configuration can be verified automatically in existing nodes as well as new nodes, and when existing nodes are upgraded with additional WSS subsystems. Also as nodes are scaled up to have more such WSS subsystems, the costs of such auto discovery do not increase as much compared to the conventional case using dedicated optical hardware. It is applicable to SDN or other types of network.

In other words, this method can be used to automatically configure multi-degree ROADM nodes by detecting the interconnection between lines/degrees and ports and consequently configuring the corresponding interconnection tables to be used by the management and SDN transport controller to properly operate the node. Notably it does not require any hardware modification but can use channel pattern recognition and power detection, and can make use of centralized knowledge of the node and network (in a SDN scenario for example). It could simplify ROADM commissioning especially for the introduction of IP/DWDM technology.

Figure 3:
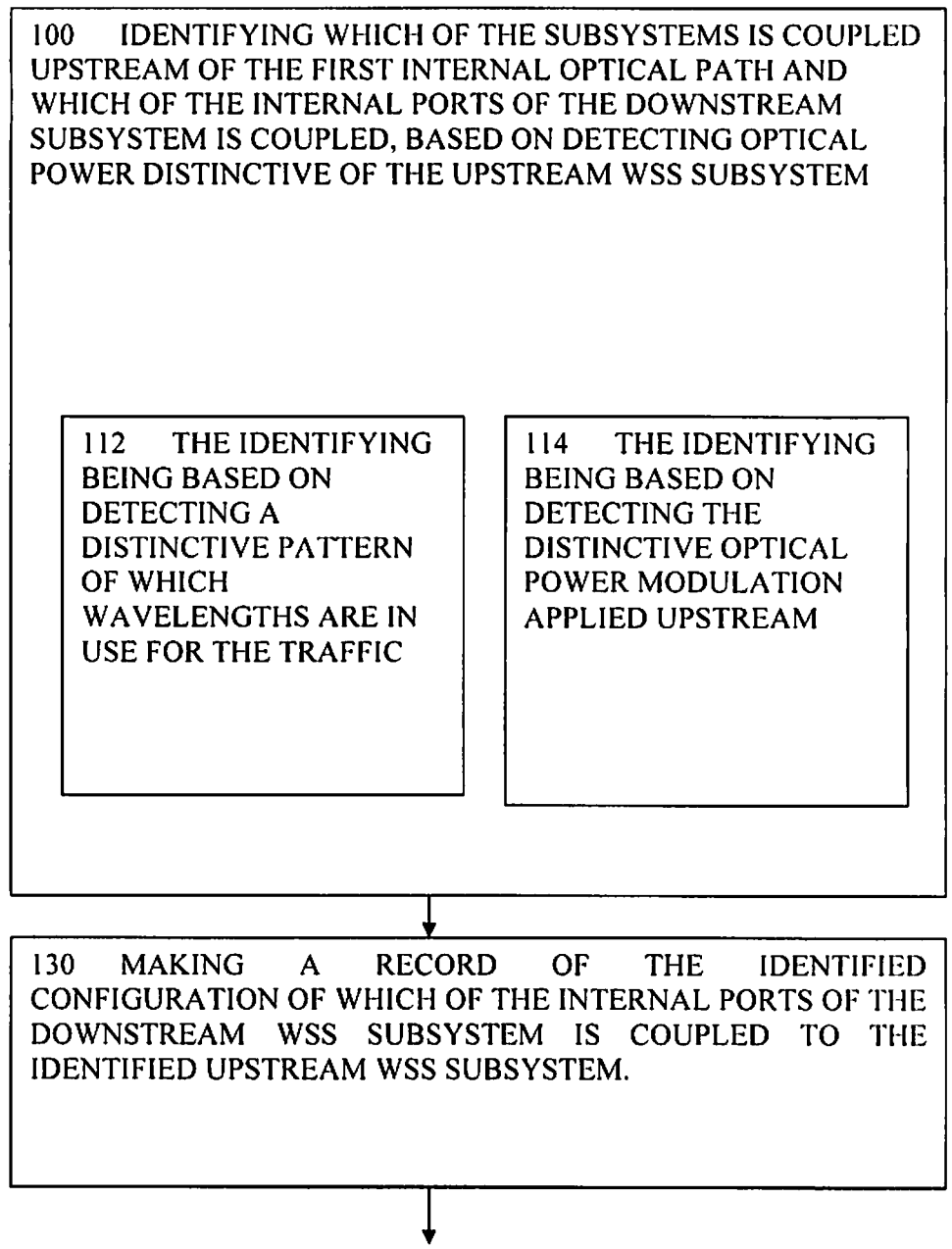
FIG. 3 shows steps of an embodiment based on detecting optical power in use.

FIG. 3 Embodiment Based on Detecting Optical Power in Use

FIG. 3 shows method steps according to an embodiment similar to that of FIG. 2 and corresponding reference numerals have been used. This shows an example which is more specific than FIG. 2 in that the identifying step is based on detecting the power of wavelengths also used for traffic, in one of two ways. Either the identifying step can be based on detecting the power of wavelengths by detecting 112 a distinctive pattern of which wavelengths are in use. Or, at step 114, the identifying can be based on detecting a distinctive optical power modulation applied upstream. These are some particular ways of detecting the distinctive optical power without needing additional dedicated hardware. Notably they can be carried out when the upstream subsystem is in use for carrying traffic. Thus it can be used when upgrading existing nodes, as well as for installation of new nodes. As before, at step 130 a record is made of the identified configuration of which of the internal ports of the downstream subsystem is coupled to the identified upstream subsystem.

Figure 4:
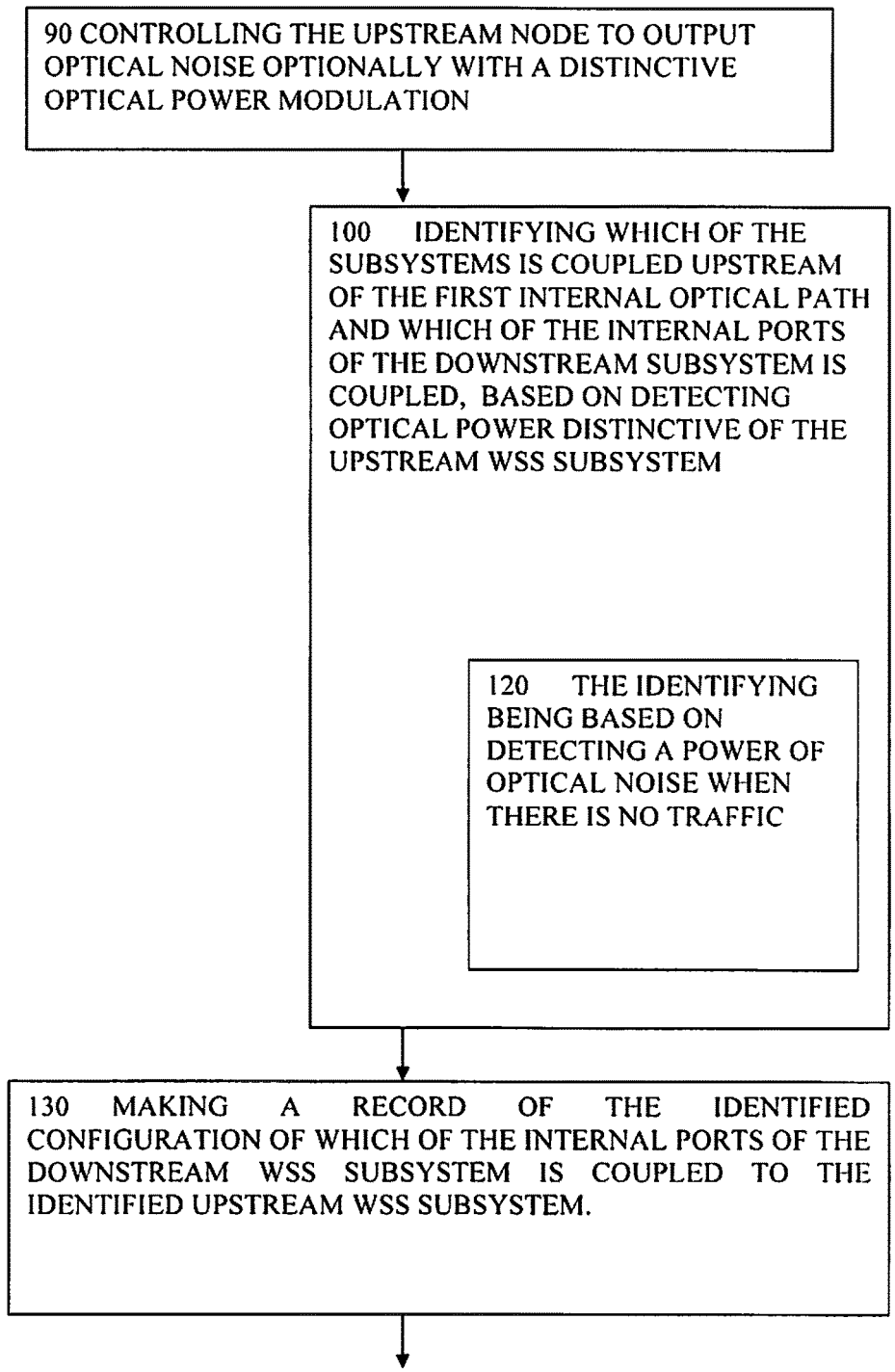
FIG. 4 shows steps of an embodiment based on detecting optical power when not in use.

FIG. 4 Embodiment Based on Detecting Optical Power when not in Use

FIG. 4 shows method steps according to an embodiment similar to that of FIG. 2 and corresponding reference numerals have been used. This shows an example which is more specific than FIG. 2 in that the identifying step is based on detecting 120 the distinctive optical power in the form of optical noise, at a time when no such noise is being output from others of the subsystems. Also there is a step 90 of controlling the upstream node to output the optical noise, optionally with a distinctive optical power modulation applied. By using optical noise, this means the connections can be verified before the WSS subsystem carries traffic, and without disrupting existing traffic on other WSS subsystems. The distinctive optical power can be provided without needing additional dedicated optical hardware. As before, at step 130 a record is made of the identified configuration of which of the internal ports of the downstream subsystem is coupled to the identified upstream subsystem. This embodiment can be carried out in combination with previous embodiments, (examples are described in more detail below with reference to FIGS. 5 to 9, or as an alternative (an example is described below in more detail with reference to FIGS. 12 to 14). The optical noise can be generated in a WSS subsystem not currently in use for traffic. This can enable checking of connections of internal optical paths in one direction, from a new WSS subsystem to any other WSS subsystem. It can also enable checking in the other direction but only from another new WSS subsystem not in use. There is no need to use noise based detection for paths from WSS subsystems currently used for traffic, towards any new WSS subsystems not yet outputting traffic, if the traffic output by the existing WSS subsystems can be broadcast or switched to all of its outward internal ports without disruption.

Figure 5:
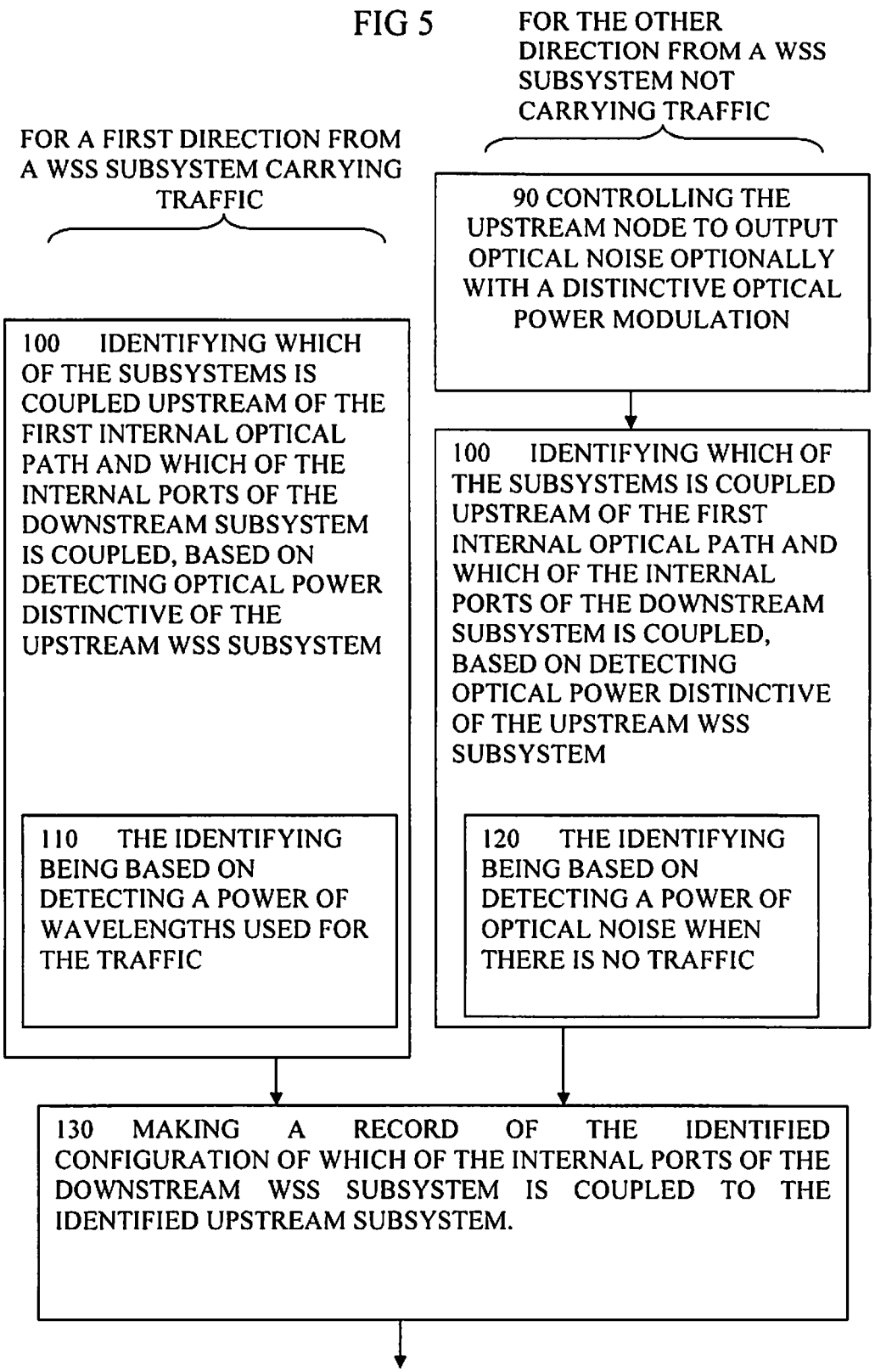
FIG. 5 shows steps of an embodiment based on combining detecting when in use and not in use.

FIG. 5, Embodiment Based on Combining Detecting Methods

FIG. 5 shows method steps according to an embodiment similar to that of FIG. 2 and corresponding reference numerals have been used. This shows an example in which features of the embodiments of FIGS. 3 and 4 are combined. The example is for a typical node having internal optical paths in both directions between the upstream and downstream WSS subsystems, and method has the identifying step being based on detecting the distinctive optical power carried by the internal optical path in one direction by detecting a power of wavelengths used for traffic, and in the other direction based on detecting the distinctive optical power by detecting a power of optical noise when there is no traffic.

Hence, as shown in a left hand side of FIG. 5, for a first direction of the internal optical path from a WSS subsystem already carrying traffic, there is a step 100 of identifying where the first internal optical path is coupled based on detecting optical power distinctive of the upstream subsystem and carried to the downstream WSS subsystem. The identifying is based on detecting 110 a power of wavelengths used for traffic. At step 130 a record is made of the identified configuration of which of the internal ports of the downstream subsystem is coupled to the identified upstream subsystem.

At the right hand side of FIG. 5, for the opposite direction of internal optical path, from a WSS subsystem not yet carrying traffic there are steps similar to those of FIG. 4. There is a step 90 of controlling the upstream node to output the optical noise, optionally with a distinctive optical power modulation applied. There is a step 100 of identifying which of the subsystems is coupled upstream of the first internal optical path and which of the internal ports of the downstream subsystem is coupled, based on detecting optical power distinctive of the upstream subsystem and carried to the downstream WSS subsystem. The identifying is based on detecting 120 the distinctive optical power in the form of optical noise, at a time when no such noise is being output from others of the subsystems. As before, at step 130 a record is made of the identified configuration of which of the internal ports of the downstream subsystem is coupled to the identified upstream subsystem. This combination of verifications of internal optical paths in both directions is particularly useful when adding a new WSS subsystem to an existing node having other WSS subsystems already carrying traffic for example.

Figure 6:
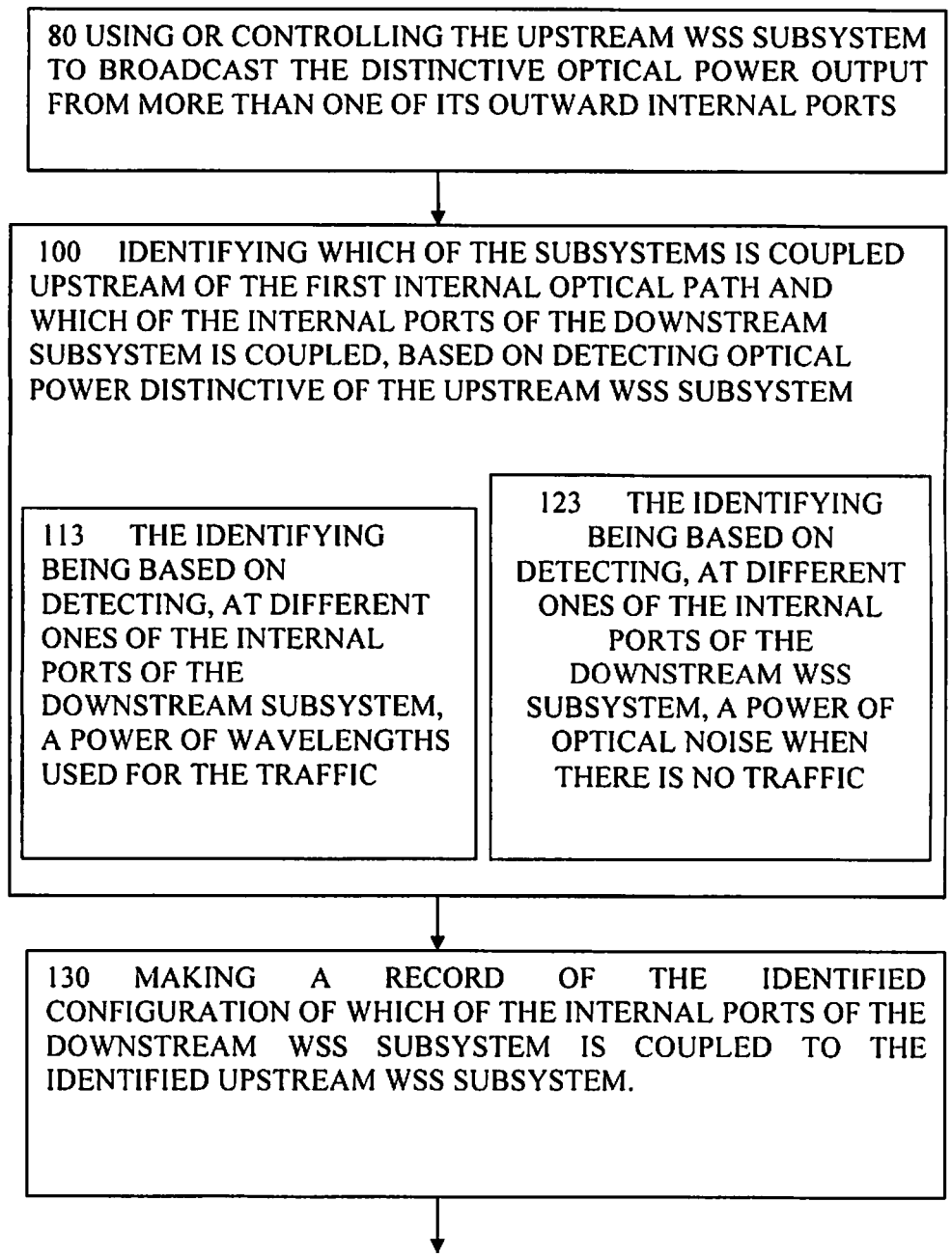
FIG. 6 shows steps of a broadcasting example.

FIG. 6, Broadcasting Example

FIG. 6 shows method steps according to an embodiment similar to that of FIG. 2 and corresponding reference numerals have been used. This shows an example in which the upstream WSS subsystem is arranged to broadcast its distinctive optical power to its outward internal ports at step 80. This can happen inherently if the distinctive optical power is the channel pattern, or the distinctive optical power can be imposed by controlling an optical component upstream such as an optical amplifier or attenuator to provide a distinctive optical power modulation. Then the identifying step 100 includes a step 113 (similar to step 110 of FIG. 2) of the identifying being based on detecting, at different ones of the inward internal ports of the downstream subsystem, a power of the wavelengths used for the traffic. Typically there is a detector on each port and so all can be detected simultaneously, if not, they can be switched in turn to a common detector. For the case that the distinctive optical power is the noise, there is a step 123 (similar to step 120 of FIG. 2) of the identifying being based on detecting, at different ones of the internal ports of the downstream subsystem, a power of the optical noise when there is no traffic. This method is suitable for the widely used broadcast and select type of node architecture. Because of the broadcasting, the individual port of the upstream WSS subsystem cannot usually be identified immediately, unless some other technique is used.

Figure 7:
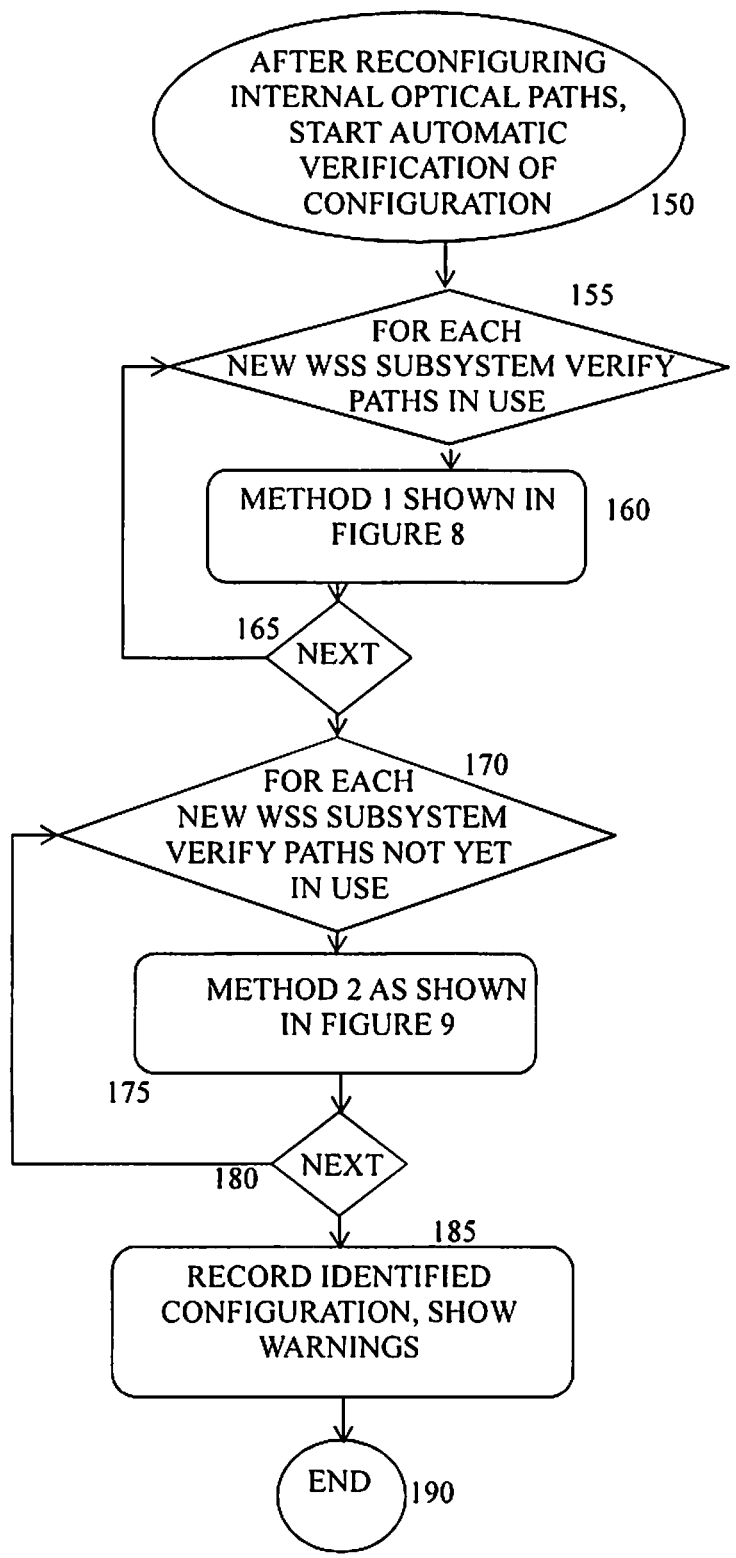
FIGS. 7 to 9 show embodiments combining methods for traffic and for no traffic cases.
Figure 8:
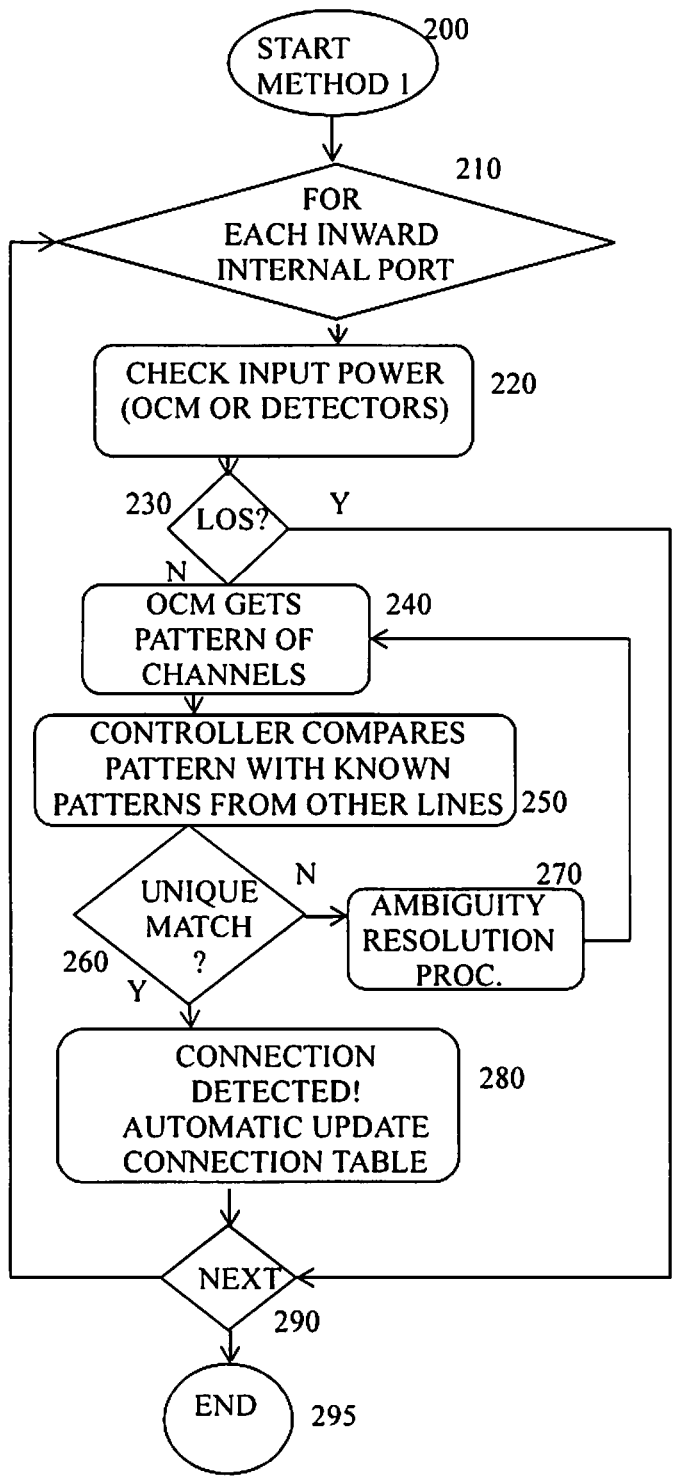
Figure 9:
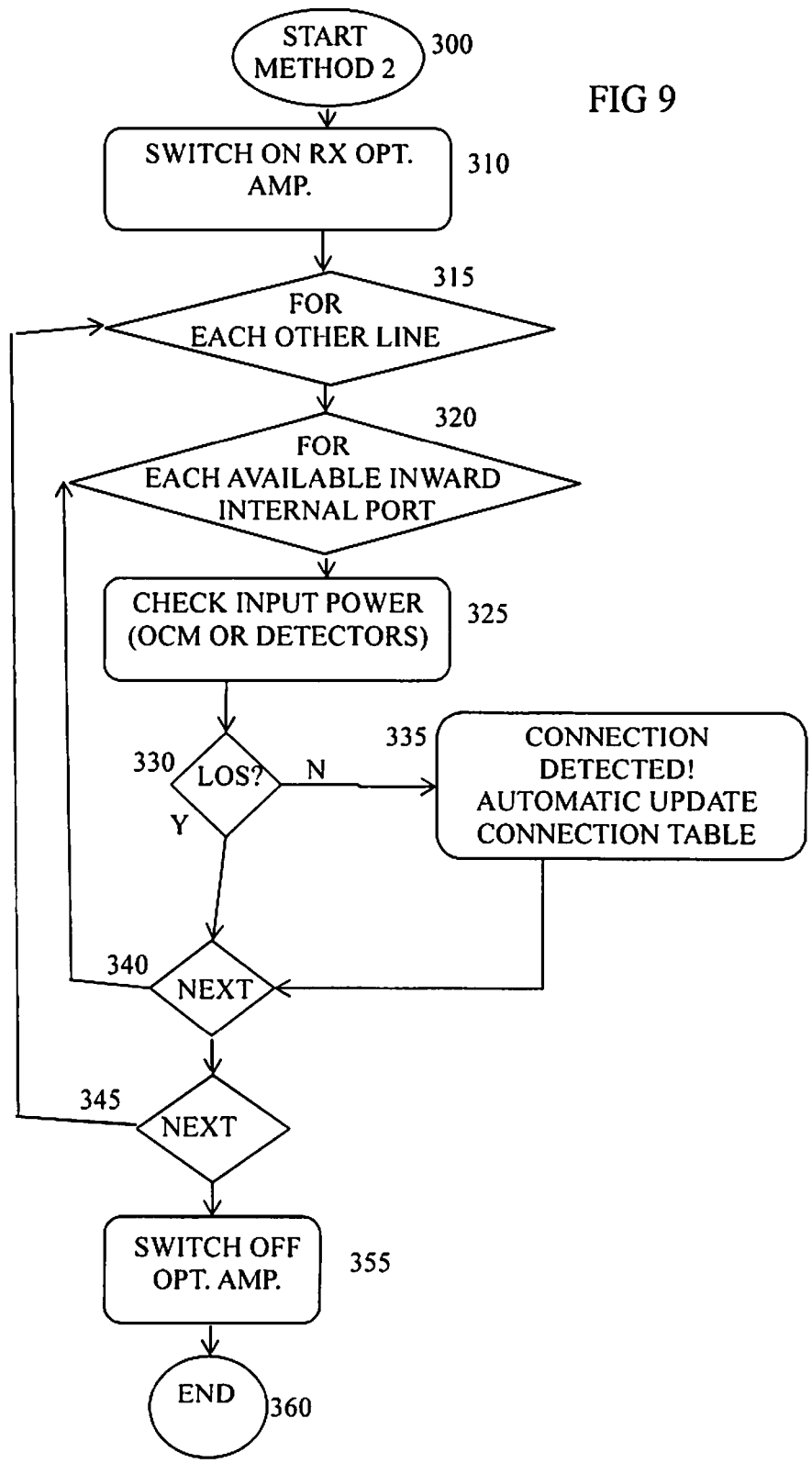

FIGS. 7 to 9, Embodiments Combining Methods for Traffic and for No Traffic Cases The flowcharts for a combined example, combining verification of internal paths carrying traffic, and internal paths not carrying traffic are shown in FIGS. 7 to 9. FIG. 7 shows an overall flowchart combining a method 1 for paths from WSS subsystems carrying traffic, and a method 2 for paths from new WSS subsystems not yet carrying traffic. FIG. 8 shows a flow chart with more details of method 1 and FIG. 9 shows a flow chart with more details of method 2. FIGS. 7 to 9 are suitable for one of the two major ROADM node architectures, the Broadcast & Select (B&S) type. The other type, Route & Select (R&S), will be discussed below in relation to FIGS. 12 to 14. In the B&S architecture, each WSS subsystem has a splitter and a WSS. The splitter is used for a receiving direction of traffic, to broadcast the incoming channels to all the outward internal ports to reach all the other WSS subsystems. The WSS is used for the transmit direction of traffic to select which wavelengths from any of the inward internal ports need to be combined (by wavelength division multiplexing) and transmitted out on the line.

The filling of the configuration table of how the internal optical paths are configured uses two different methods depending on whether the WSS subsystem upstream of a given internal path where the signal is sourced from is not carrying traffic (for example a newly installed one) (method 2, FIG. 9) or if it is already carrying in-service traffic (e.g. at node upgrade) (method 1, FIG. 8). Before the method can be started, the installer should have already installed the WSS subsystems into the node and coupled all the fibers of the internal paths between the internal ports. Some guide-lines are usually applied but the method can work for any arrangement of the internal paths. The installer should have already configured the new WSS subsystems to be coupled to the management systems of the node or the element managers of the network management system so that any new WSS subsystems are accessible for passing on detections and responding to control commands. The installer can configure the identifier (also called degree number) of any new WSS subsystems, or this can easily be done automatically as well.

Then the installer can start the verification (auto configuration) for example by pressing an 'Auto-configuration button' on a management system or network controller and the automatic process will start as shown by step 150 in FIG. 7. For each new WSS subsystem installed, the two methods are applied to detect interconnections from existing WSS subsystems to new ones and from each new WSS subsystem to all others (existing or other new ones) respectively. These flow charts give a possible method implementation without limiting its generality, the order of operations may be changed or steps removed or replaced. The person skilled in the art can modify the given flow charts, for example to add steps at various places to detect and respond to configuration errors like 'missing connection' or 'connection duplicated' etc. At step 155 a loop is started for each new WSS subsystem, then at step 160, method 1 is carried out as shown and described below in relation to FIG. 8. This method 1 is used for detecting internal optical paths only from other WSS subsystems which are already broadcasting traffic, while method 2 is needed for internal paths from WSS subsystems which are not yet in use for traffic.

At step 165 the next new WSS subsystem is taken and method 1 is repeated until there are no more new WSS subsystems. Then at step 170 a new loop is started for each new WSS subsystem to verify internal optical paths from each new WSS subsystem. At step 175 method 2 is carried out, as shown and described below in relation to FIG. 9. At step 180 the next new WSS subsystem is taken until there are no more. The identified configuration is recorded and any warnings about miss-connections are output at step 185 and the method ends at step 190. In principle the 2 methods can be combined in other ways, for example by changing their order, by having them both in the same loop, or in nested loops.

Once the auto-configuration is completed the controller can issue an 'auto-configuration successfully completed' message if no errors have been found. If some inconsistencies are detected a dedicated warning can be given: for example, missing or duplicated connections. Note that the method can be applied not only to directionless/colourless/non-blocking architecture of nodes but also to more restricted direction limited or colour limited, or blocking architectures. Note that it is not always essential that both methods 1 and 2 are carried out. If all the WSS subsystems are not carrying traffic, e.g. for a new node or a node having all its WSS subsystems upgraded, then method 1 is not needed. If all the WSS subsystems are carrying traffic, then method 2 is not needed, for example if the NMS generates and sends dummy traffic along all the lines to and from a new node to test the new node, assuming that a default configuration table has been filled and the method is used for checking this.

FIG. 8, Identifying Connections from Upstream WSS Subsystems Already in Use

FIG. 8 shows steps for identifying connections coming from other WSS subsystems already in service. This can be accomplished in various ways, and in this case channel pattern identification is used as shown in the flowchart for method 1 in FIG. 8. Since there may be more than one existing WSS subsystem sending channels of traffic the identification method cannot rely on simple power detection, so the channel pattern identification is one way of distinguishing between the sources. The new WSS subsystem is regarded as the downstream WSS subsystem in this case, and existing WSS subsystems are upstream (the opposite applies for method 2). The flowchart starts at step 200, and a for-next loop is shown at step 210 for each inward internal port of the downstream WSS subsystem in turn, the port is enabled and an initial check for optical power is made at step 220 using either an OCM or a simpler power detector at step 220. At step 230 if there is a loss of signal (LOS), then the loop moves to the next port. If there is no LOS then at step 240 a scan with the OCM is performed to identify which wavelengths are received (this is the channel pattern) at this inward internal port. Then at step 250, each of the patterns is compared to the expected channel pattern from each of the other WSS subsystems. The actual connections between each internal port of the downstream WSS subsystem and the other WSS subsystems are therefore mapped following the pattern matching. The known or expected channel pattern information of the traffic from the other WSS subsystems is known by the system/node controller (SDN, NMS) either by information on routed traffic or locally from the already mapped connections and wavelength selection.

Unused ports will have a LOS signal, if managed; otherwise an OCM scan could be done obtaining same LOS information: these ports will be skipped by the procedure. It may happen, owing to rare symmetrical configurations, that the channel pattern is not always unique and distinctive of each upstream WSS subsystem, and thus there is a residual ambiguity for two or more of the WSS subsystems. This can be detected at step 260 and can be resolved by an ambiguity resolution procedure at step 270. In this case the ambiguity can be resolved by the SDN/Transport controller which can route a 'dummy channel' cloned from an adjacent network node toward one of the ambiguous lines and break the ambiguity: this 'dummy channel' is blocked by all the other WSS subsystems in the node. An alternative is to add a simple optical power modulation onto the optical signal from one of the upstream WSS subsystems to make it distinctive. This can be detected by the optical power detector in the downstream WSS subsystem, and can be applied at the upstream WSS subsystem by controlling the optical power from an optical amplifier.

Assuming a unique match is found at step 260, between a detected channel pattern and an expected channel pattern, at step 280 this means an upstream WSS subsystem is identified and a connection is detected. The connection table is updated with the association of the identified upstream WSS subsystem and the relevant inward input port of the downstream WSS subsystem. At step 290 the loop repeats for the next one of the inward internal ports until all are checked and the method ends at step 295.

FIG. 9, Identifying Connections from New WSS Subsystems not Yet in Use

FIG. 9 shows steps for identifying connections from new WSS subsystems not carrying traffic, to any other WSS subsystems (new or existing). These other WSS subsystems are therefore regarded as downstream. This can be accomplished in various ways, and in this case optical noise detection is used as shown in the flowchart for method 2 in FIG. 9. Since there may be more than one other new WSS subsystem, and since optical noise is not inherently distinctive, method 2 includes switching on only one of these noise sources in turn. Assuming no channels are already present and thus no traffic is passing onto internal optical paths from the new WSS subsystem being installed, the method starts at step 300, and the new WSS subsystem is regarded as the upstream WSS subsystem. Detection takes place at the other WSS subsystems, which are regarded as downstream and it is immaterial whether they are existing WSS subsystems already carrying traffic or new ones not yet carrying traffic (though method 1 would have already found the connections if they are carrying traffic, so there is no need to duplicate the verification of these).

At step 310 the optical noise is generated in the upstream WSS subsystem by switching on the RX amplifier (optical amplifiers are always present in WSS subsystems) of the new WSS subsystem, while ensuring that the corresponding RX amplifier in any other new WSS subsystems is not switched on. At step 315 a loop is started for each downstream other WSS subsystem. A nested loop is started at step 320 for each available inward internal port of the current downstream WSS subsystem which is available in the sense of not already having a connection and an entry in the configuration table. At step 325 a check for optical power is made using either an OCM or a simpler power detector. At step 330 if there is a loss of signal LOS, then the loop moves to the next port at step 340. If there is no LOS then at step 335 this means a connection to the upstream WSS subsystem is identified. Only the available inward internal ports of the downstream WSS subsystem should be checked so that no LOS does indicate detection of the noise, not detection of an existing signal which could be present on previously configured ports. The connection table is updated with the association of the identified upstream WSS subsystem and the relevant inward input port of the downstream WSS subsystem. At step 340 the loop repeats for the next one of the available inward internal ports until all are checked and then the outer loop repeats at step 345 until all the downstream WSS subsystems have been checked, then the method ends at step 360. At various points in the method warnings could be issued alerting of missing connections or duplicated connections, or of connections inconsistent with a plan. Or the connection table could be analysed later to identify such mis-connections.

If there are more than one new WSS subsystems being installed the method can be repeated for each one. For more confidence on the identifications, the optical noise can be made distinctive by having a superimposed power modulation by controlling the optical amplifier. The power can be modulated between two levels (or on/off) at low frequency for example, and this can be detected as well as or instead of simply detecting a LOS.

Figure 10:
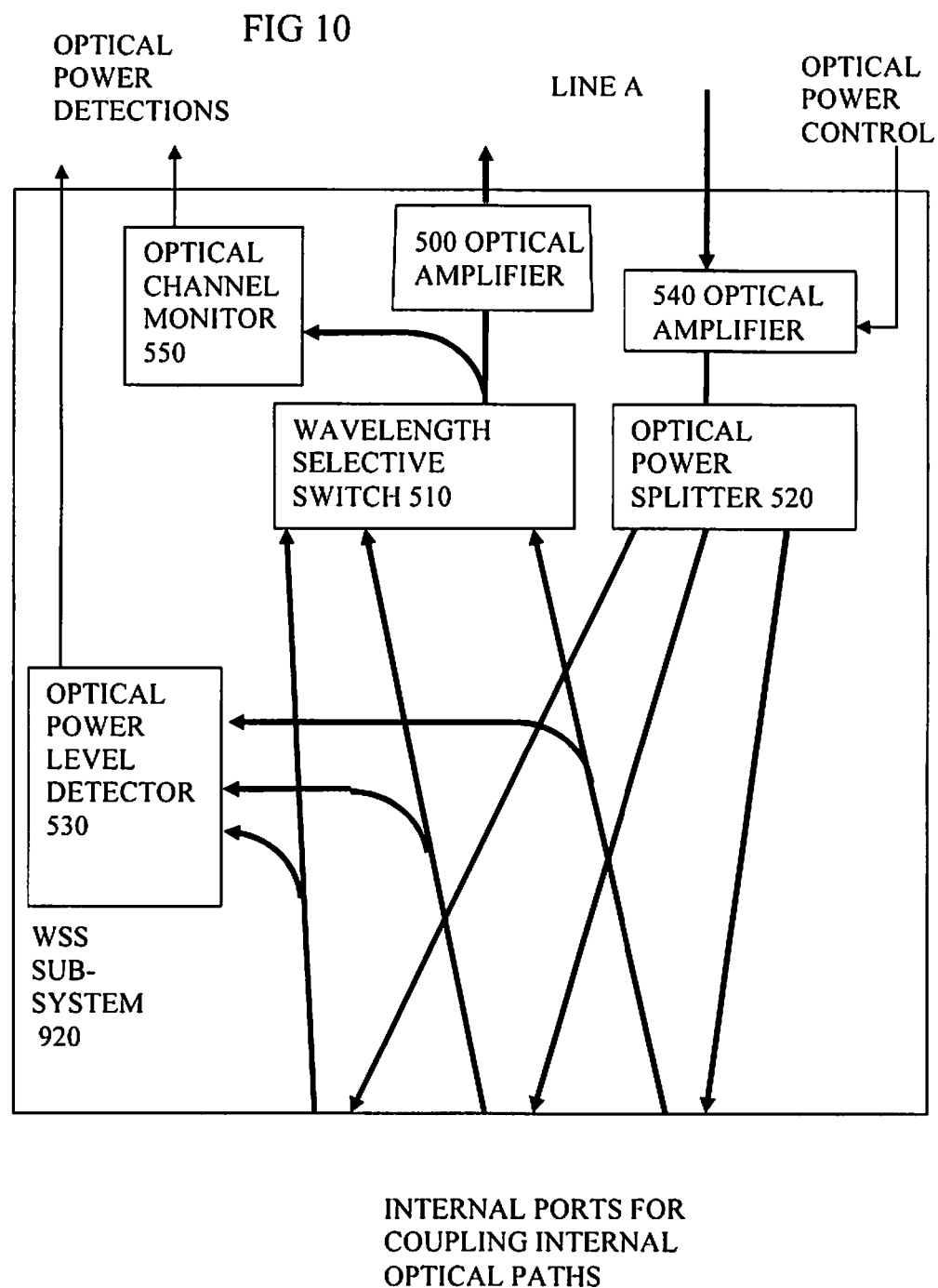
FIG. 10 shows a schematic view of a WSS subsystem having B & S architecture.

FIG. 10, Schematic View of a WSS Subsystem Having B & S Architecture

FIG. 10 shows one example of how a WSS subsystem 920 having a B & S architecture can be implemented, other ways are possible. There is a wavelength selective switch WSS 510 for selecting wavelengths for output, from the inward internal ports. An optical power splitter 520 is provided for broadcasting the received optical spectrum received on the line input, to all of the outward internal ports. An optical power detector 530 is provided for detecting optical power on each of the inward internal ports and outputting a loss of signal LOS if no power is detected. An optical channel monitor OCM 550 is provided coupled to an output of the WSS, so as to monitor which of the channels are present. This can be arranged to monitor the channels selected by the WSS, or can be arranged to monitor any of the inputs to the WSS. Either the power detector or the OCM can be used to detect optical noise. It is also possible to have multiport OCM parts to provide channel monitoring on some or all of the inward internal ports. An optical amplifier 500 is provided on the output to line A, and some equalisation of the powers of the various wavelengths is provided, typically within the WSS. Another optical amplifier is provided on the input from line A before the optical splitter. This can be controlled by a control signal from the node controller or the NMS, to provide the distinctive optical power for use in the methods described above. In one alternative, one new WSS subsystem can have its optical amplifier switched on to broadcast optical noise, while other new WSS subsystems have their corresponding optical amplifiers switched off so that the noise is distinctive in that it has a unique source. In another alternative the power of the optical amplifier can be controlled to provide a distinctive modulation.

Figure 11:
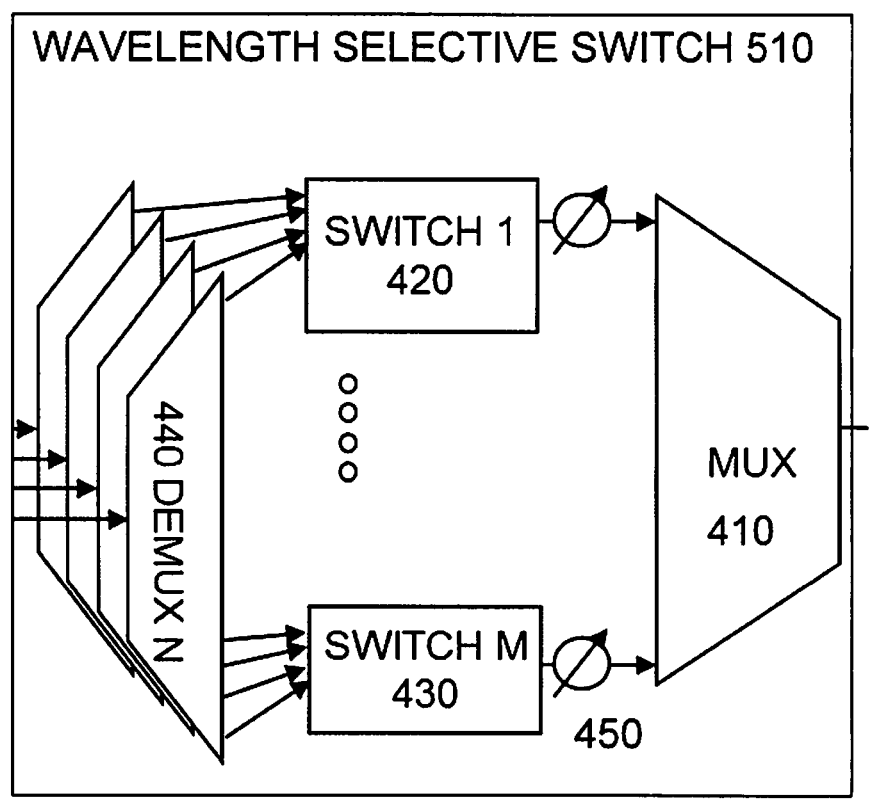
FIG. 11 shows a schematic view of an example of a WSS.

FIG. 11, WSS Example

FIG. 11 shows a schematic view of some of the main functions of the WSS 510 shown in FIG. 10. Incoming lines from the inward internal ports of the WSS subsystem are each demultiplexed by wavelength demultiplexer 440, into individual channels, or wavelengths. Optical switches 1 to M are provided 420, 430 one for each channel, and each coupled to a corresponding channel of each of the demultiplexers so that each switch can select from any of the inward internal ports. An optical attenuator or amplifier 450 is provided for each switch output to provide equalisation to balance the optical powers of the different channels before they are multiplexed together by wavelength multiplexer 410. This outputs a wavelength division multiplexed optical signal for transmitting on the line to another node. The arrangement of components shown in FIG. 10 is representative of the functions, or logical operation, but practical implementations can use different components or combinations of these functions.

Figure 14:
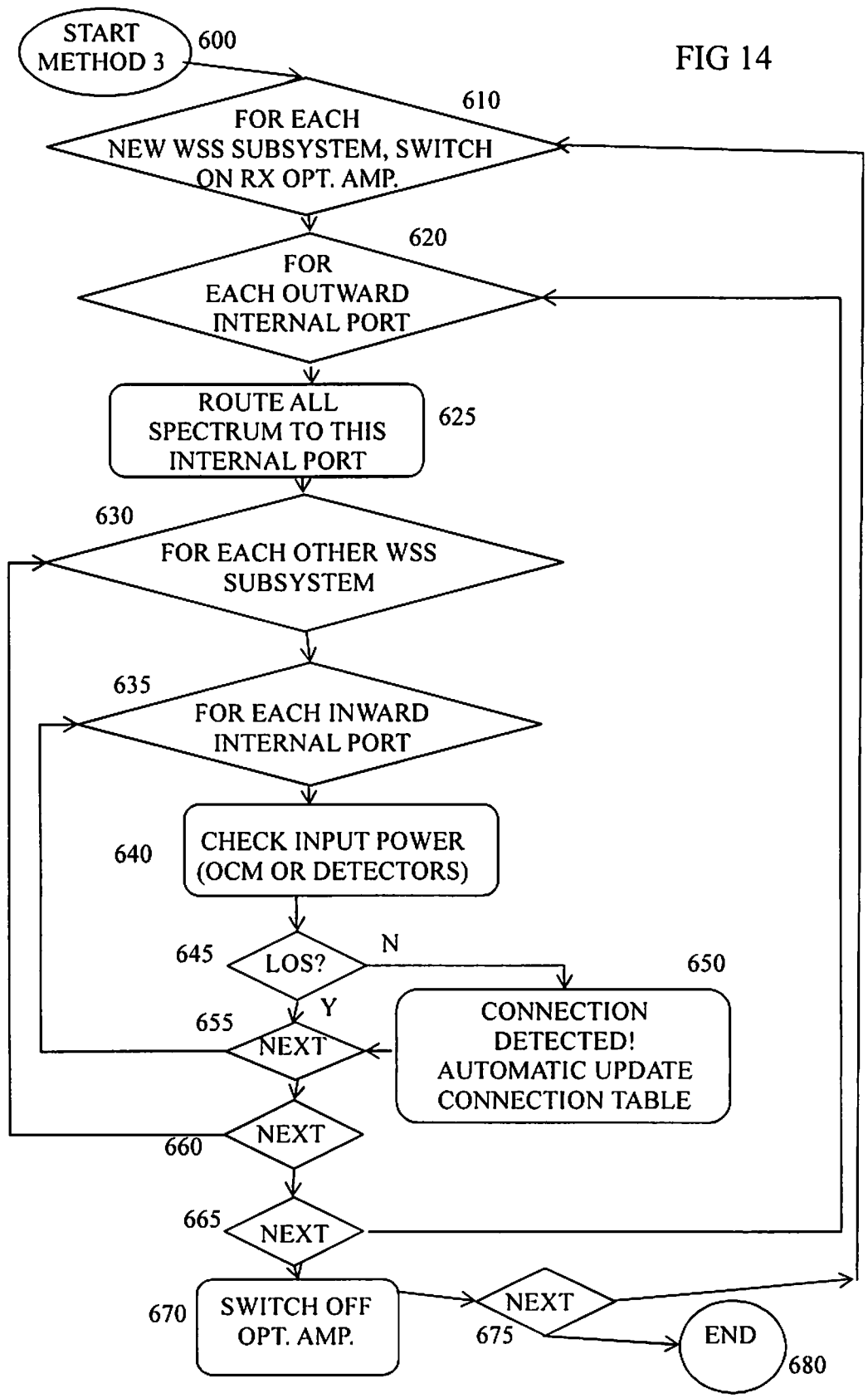

FIGS. 12 to 14 Route and Select Architecture

The route and select architecture differs from the B&S in that the splitters on the receive side of each WSS subsystem are replaced with a WSS. In this way only the wavelengths to be routed to a particular internal port are selected and they are not broadcast on all outward internal ports. In this case method 3, a modified version of method 2 described for the B&S architecture can still be applied with the difference that once the RX optical amplifier is switched on then each WSS outward internal port must be opened, one by one in turn, and each allows the whole spectrum to be output. In this way an optical power output in the form of optical noise such as ASE noise with no channels can be provided which can be detected by the other WSS subsystems. Optionally the noise can be made more distinctive with an applied power modulation. The other degrees can detect the incoming ASE signal and the controller can map the correspondence of which outward internal port of the upstream WSS subsystem is connected to which inward internal port of the downstream WSS subsystem. In this case method 1 is not required because unlike the broadcast case, the routing at the upstream WSS subsystem means that when a connection is identified the outward internal port is inherently and uniquely known, as well as the inward internal port at the downstream WSS subsystem. Once this modified method 2 identifies the pair of internal ports connected for one direction, the other direction is automatically assumed to use the same ports, at least for the case that duplex patch cords are used for the internal paths. Such duplex patch cords are commonly used and mean that it is difficult or impossible to connect the different directions to different ports, so the risk of fiber misconnection is very low. This was not possible with the B&S architecture because the splitter at the upstream side did not allow the identification of the outward internal port due to the broadcast nature of the splitter. An alternative way to enable identification in the other direction if duplex patch cords are not used is to open all unused outward internal ports of each in-service WSS subsystem in turn to transmit optical noise. At the new WSS subsystem, one inward internal port should detect the noise as a NOT-LOS condition, and thus identify the ports and upstream WSS subsystem. However in some cases the low ASE noise level available (because real channels are present) may make this alternative less straightforward to implement.

The modified method 2 adapted for the R&S architecture is shown in FIG. 14. Compared to FIG. 8, additional outer loops have been added to implement the WSS outward internal port scanning, and to act on each new WSS subsystem in turn. The method 3 starts at step 600, and for each new WSS subsystem, the RX optical amplifier is switched on at step 610 to generate the optical noise, while any other new WSS subsystems are kept switched off, (for example by having the WSS block all spectrum from any port) so that there is a unique source of the optical noise. At step 620 a loop is started for each outward internal port of the new WSS subsystem, which is regarded as the upstream WSS subsystem. At step 625 all the spectrum is routed to this outward internal port. This typically involves controlling the WSS acting as the optical router 560 shown in FIG. 12. At step 630 a loop is started for each other WSS subsystem, these will be regarded as the downstream WSS subsystems. At step 635 a loop is started for each available inward internal port. The input power is checked at step 640, typically using optical power level detectors 530 or OCM 550 shown in FIG. 12. If a LOS state is detected at step 645, then there is no connection to that internal port and the method returns to step 635 for the next inward internal port. If a LOS is not detected, then, as long as only the available inward internal ports are checked, the optical noise must be what has been detected and at step 650 a connection is declared and the connection table automatically updated, and the loop returns to step 635 for the next available inward internal port. For a node having a route and select architecture, there is no need to continue this loop to check other available inward internal ports as the noise would not be broadcast on more than one path.

After all the inward internal ports have been checked, at step 660 the method returns to step 630 to move onto the next downstream WSS subsystem, and repeats steps 635 to 650. After all the downstream subsystems have been checked, at step 665, the method returns to step 620 to the next one of the outward internal ports and the spectrum is all routed to only this next one of the outward internal ports and the checking process is repeated. After all the outward internal ports have been exercised, at step 670 the optical amplifier is switched off, and the next new WSS subsystem is selected at step 675 and the process is repeated from step 610 until all the new WSS subsystems have been used and the configuration table will be full and the method ends at step 680. It is not essential that the loops are done in the order shown, other arrangements are possible.

Figure 15:
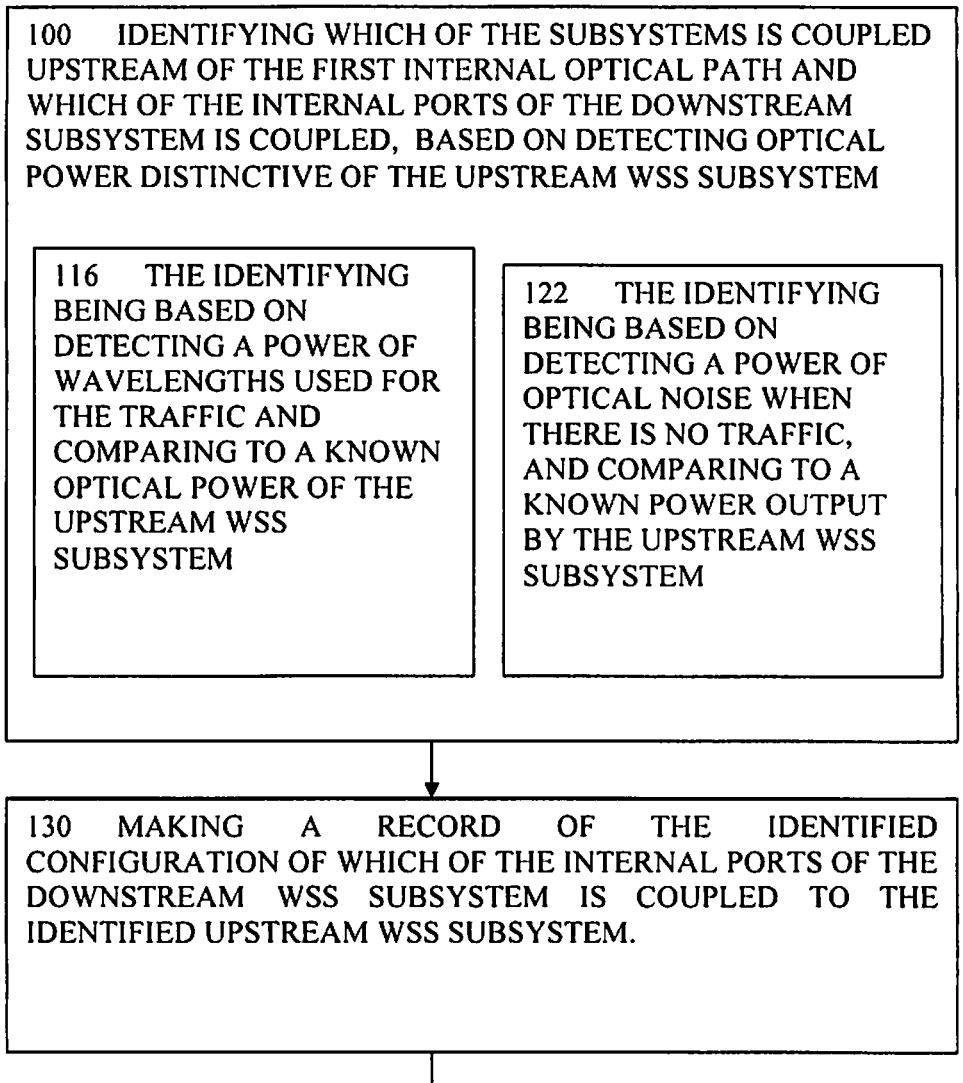
FIG. 15 shows steps of an embodiment having comparison to known optical power.

FIG. 15 Embodiment Having Comparison to Known Optical Power

FIG. 15 shows method steps according to an embodiment similar to that of FIG. 2 and corresponding reference numerals have been used. This shows an example in which the identifying step comprises comparing the detected distinctive optical power to a known optical power output by the upstream subsystem. So step 100 of identifying which of the WSS subsystems is coupled upstream of the first internal optical path, and which of the internal ports of the downstream subsystem is coupled, includes step 116 of the identifying being based on detecting a power of the wavelengths used for the traffic and comparing to a known optical power of the upstream WSS subsystem. This can encompass a known pattern of which channels are sent from each upstream WSS subsystem, or a known pattern of applied optical power modulation for example. For the case that the distinctive optical power is optical noise, the identifying can be based on detecting a power of optical noise when there is no traffic, and comparing to a known power output by the upstream WSS subsystem. This known power output can be for example whether or not the respective WSS subsystem upstream is generating noise at the moment of detection, or can be for example a known distinctive optical power modulation.

Figure 16:
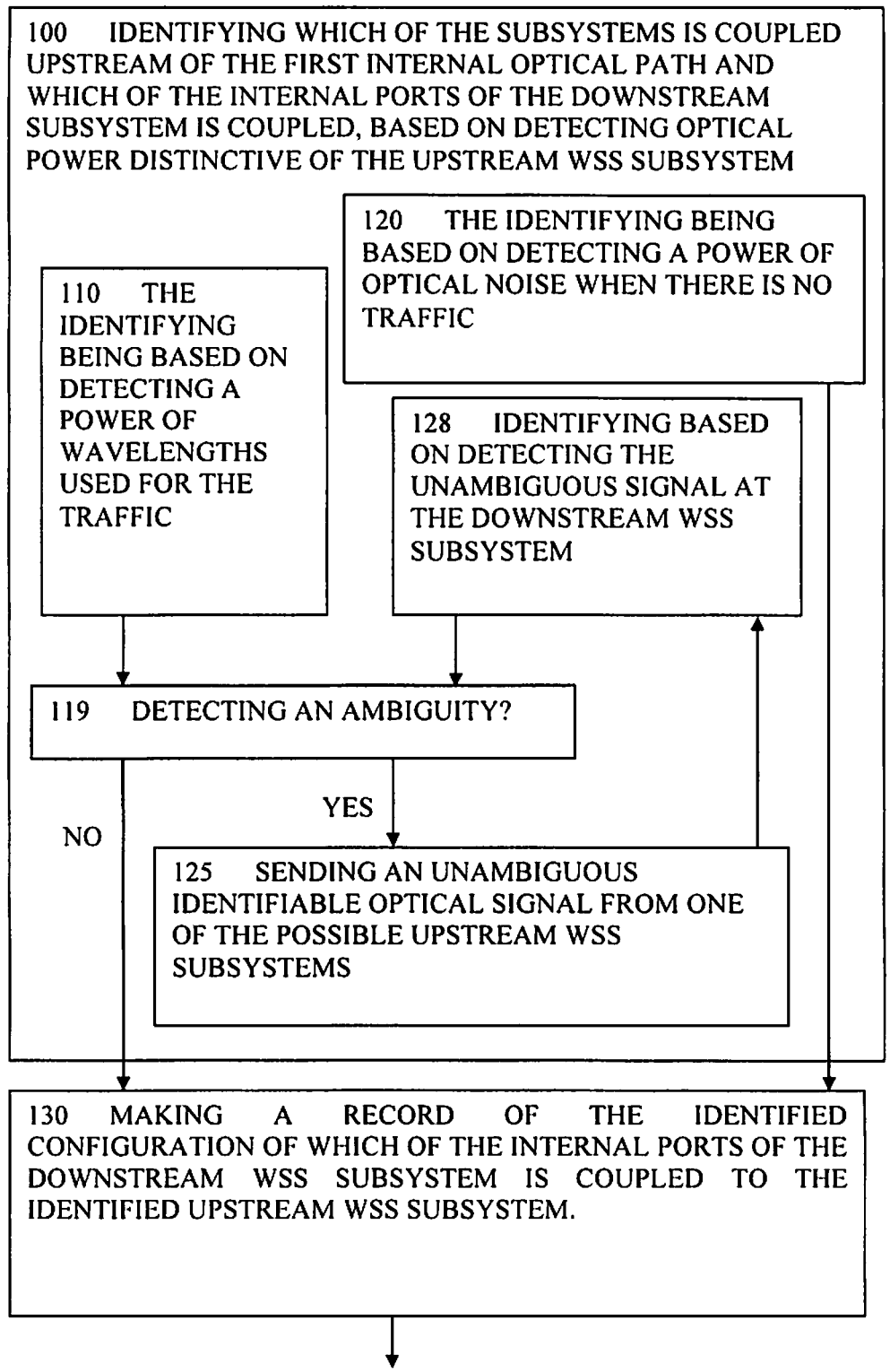
FIG. 16 shows steps of an embodiment having ambiguity resolution.

FIG. 16 Embodiment having Ambiguity Resolution:

FIG. 16 shows method steps according to an embodiment similar to that of FIG. 2 and corresponding reference numerals have been used. This shows an example in which the identifying step 100 includes step 110 as before for the identifying being based on detecting a power of wavelengths used for traffic, and step 120 of the identifying being based on detecting a power of optical noise when there is no traffic. In the case of detecting power of wavelengths, if there is an ambiguity this is detected at step 119. This includes finding an ambiguity in the sense that the distinctive optical power is distinctive of two or more WSS subsystems and so cant be used to identify the WSS subsystem uniquely. Accordingly an ambiguity resolution process is used at step 125. This involves sending an unambiguous identifiable optical signal. This can be detected downstream at step 128, and providing the ambiguity no longer exists, the method moves on to step 130 as before. For the case of detecting noise, there should be no ambiguity because there should be a single source of noise and only one receiver switched on at any time.

One way of implementing sending such an unambiguous signal is for the controller to route a 'dummy channel' cloned from an adjacent network node towards one of the ambiguous lines and break the ambiguity. This 'dummy channel' is blocked by all the other WSS subsystems in the node. This is done by external routing of this dummy wavelength. A centralized transport controller (e.g. SDN controller) has knowledge of the whole network and can temporally open another path from neighbouring nodes to route a 'clone' of a wavelength in order to resolve the ambiguity of equal patterns coming from different lines.

For example, if a pattern of channels of traffic is identical on two different incoming lines from say a node A and a node C, to a Node B, the OCM in node B cannot distinguish between them. To resolve this, the SDN controller identifies a different wavelength existing in the network, and not used by node B, and routes a copy of it to node B via node A or node C to differentiate the patterns. At the end of the procedure the 'dummy' wavelength is blocked again in node A or node C respectively. This operation can be done without affecting the in service operation.

An alternative is to add a simple optical power modulation onto the optical signal from one of the upstream WSS subsystems to make it distinctive. This can be detected by the optical power detector in the downstream WSS subsystem, and can be applied at the upstream WSS subsystem by controlling the optical power from an optical amplifier.

Figure 17:
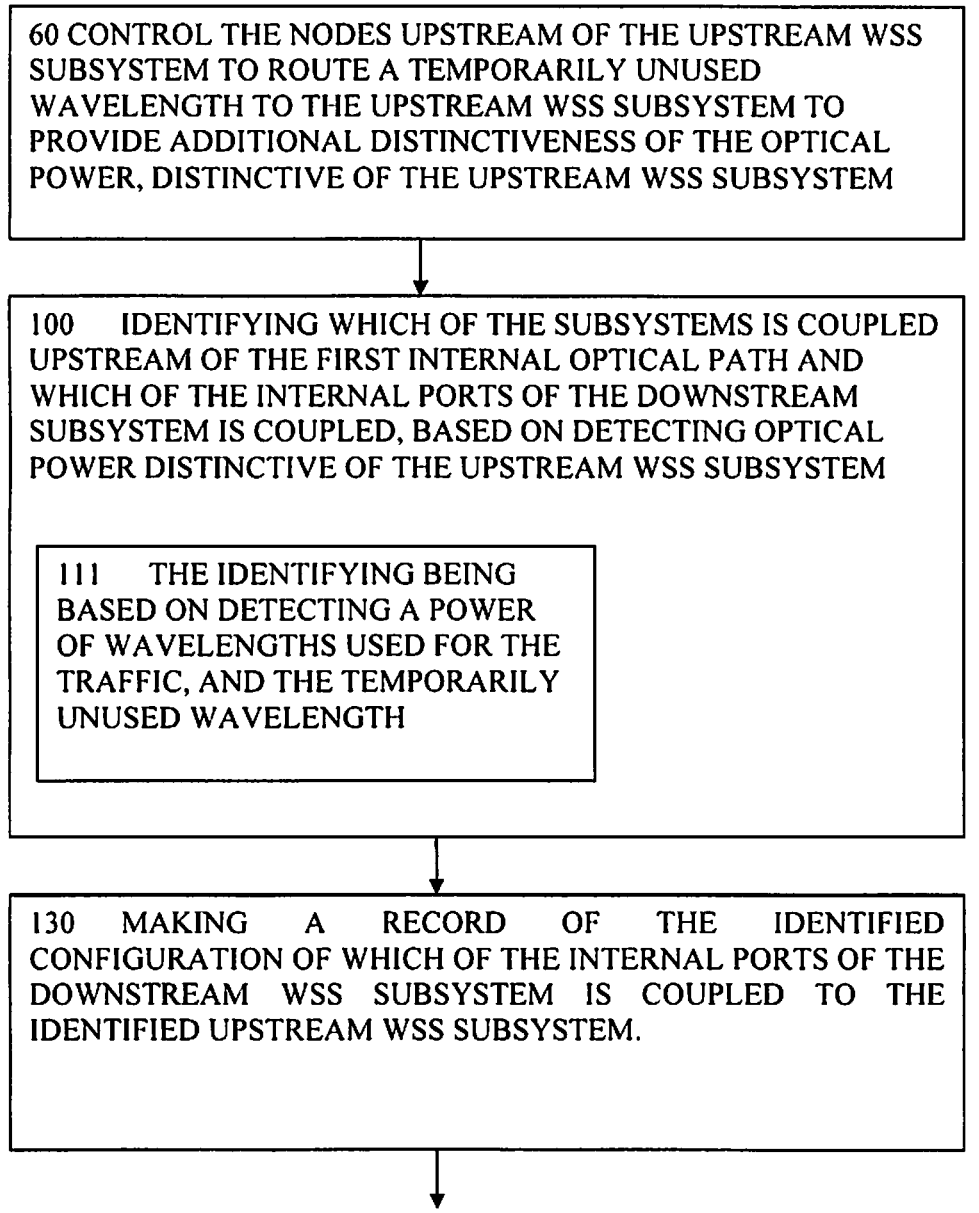
FIG. 17 shows steps of an embodiment using a temporarily unused wavelength.

FIG. 17 Embodiment Using Temporarily Unused Wavelength

FIG. 17 shows method steps according to an embodiment similar to that of FIG. 2 and corresponding reference numerals have been used. This shows an example in which a temporarily unused wavelength is routed to provide additional distinctiveness in the optical power. There is an initial step 60 of controlling the nodes of the network upstream of the upstream WSS subsystem to route the temporarily unused wavelength to the upstream WSS subsystem. The identifying step 100 includes a step 111 for the identifying being based on detecting a power of wavelengths used for traffic, including the temporarily unused wavelength. This can be used to pre-empt a risk of ambiguity for example, provided there are spare temporarily unused wavelengths available. It can be used either in combination with detecting the channel pattern or conceivably as an alternative to detecting the noise for example, if there is no suitable source of noise perhaps.

Figure 18:
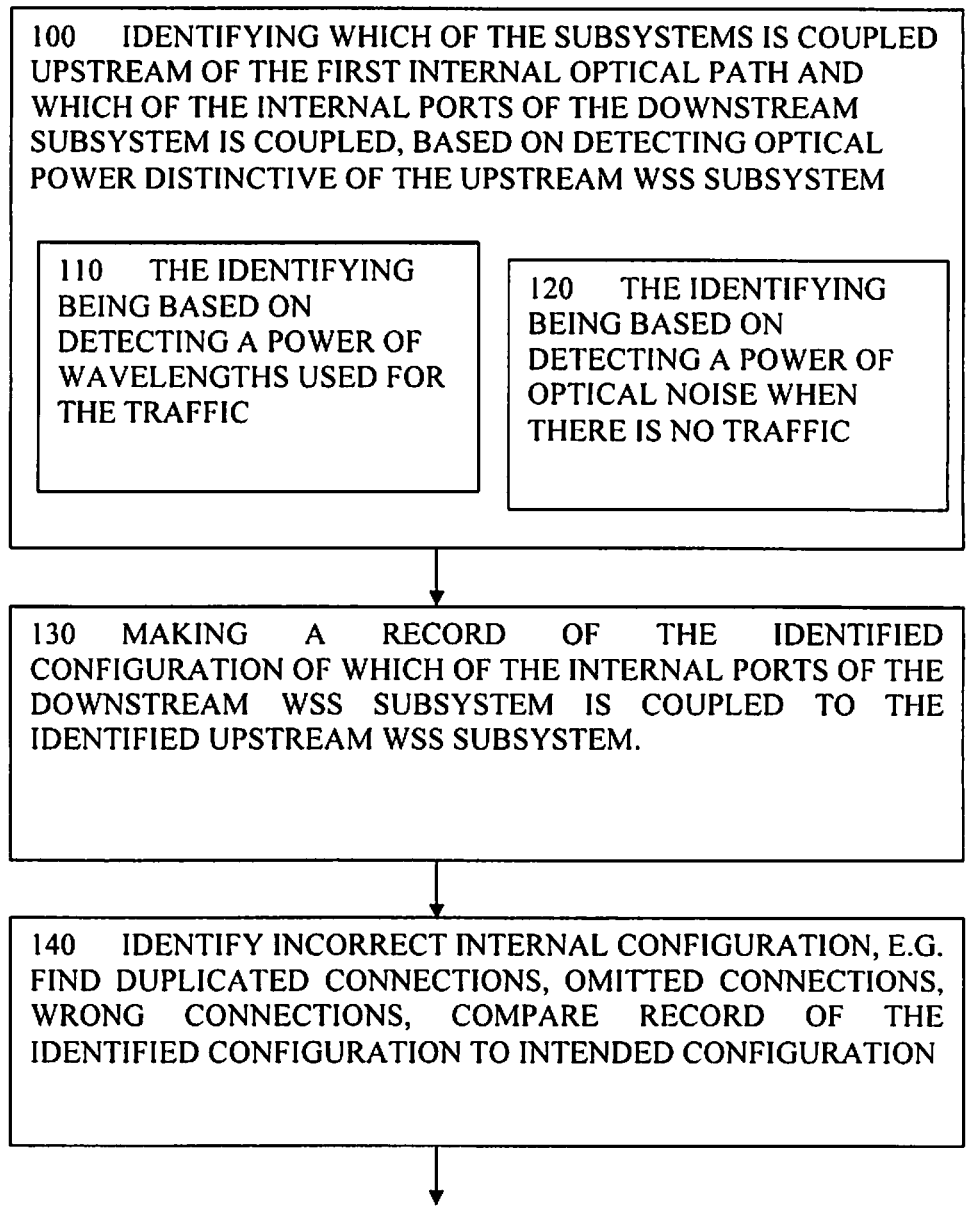
FIG. 18 shows steps of an embodiment finding incorrect configuration from the table.

FIG. 18 Embodiment Finding Incorrect Config from Table

FIG. 18 shows method steps according to an embodiment similar to that of FIG. 2 and corresponding reference numerals have been used. This shows an example in which the resulting configuration table is analysed for various types of mis-connection, for example duplicated connections, omitted connections, or wrong connections, for example by comparing to a record of the intended configuration. This can either be carried out while the table is being filled or after it has been completed. Any such mis-connections can be used to trigger warnings or can be used to trigger other actions such as repeating part or all of the verification process.

Figure 19:
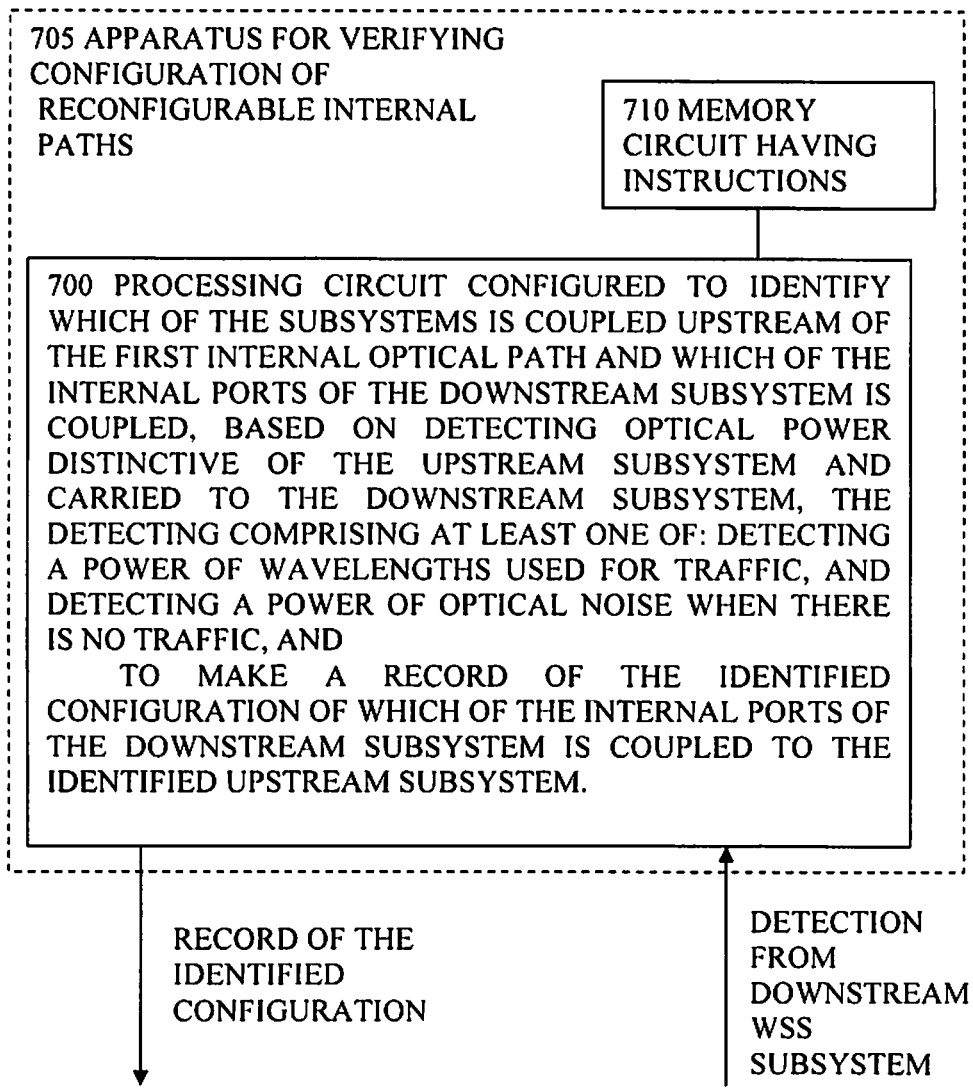
Figure 21:
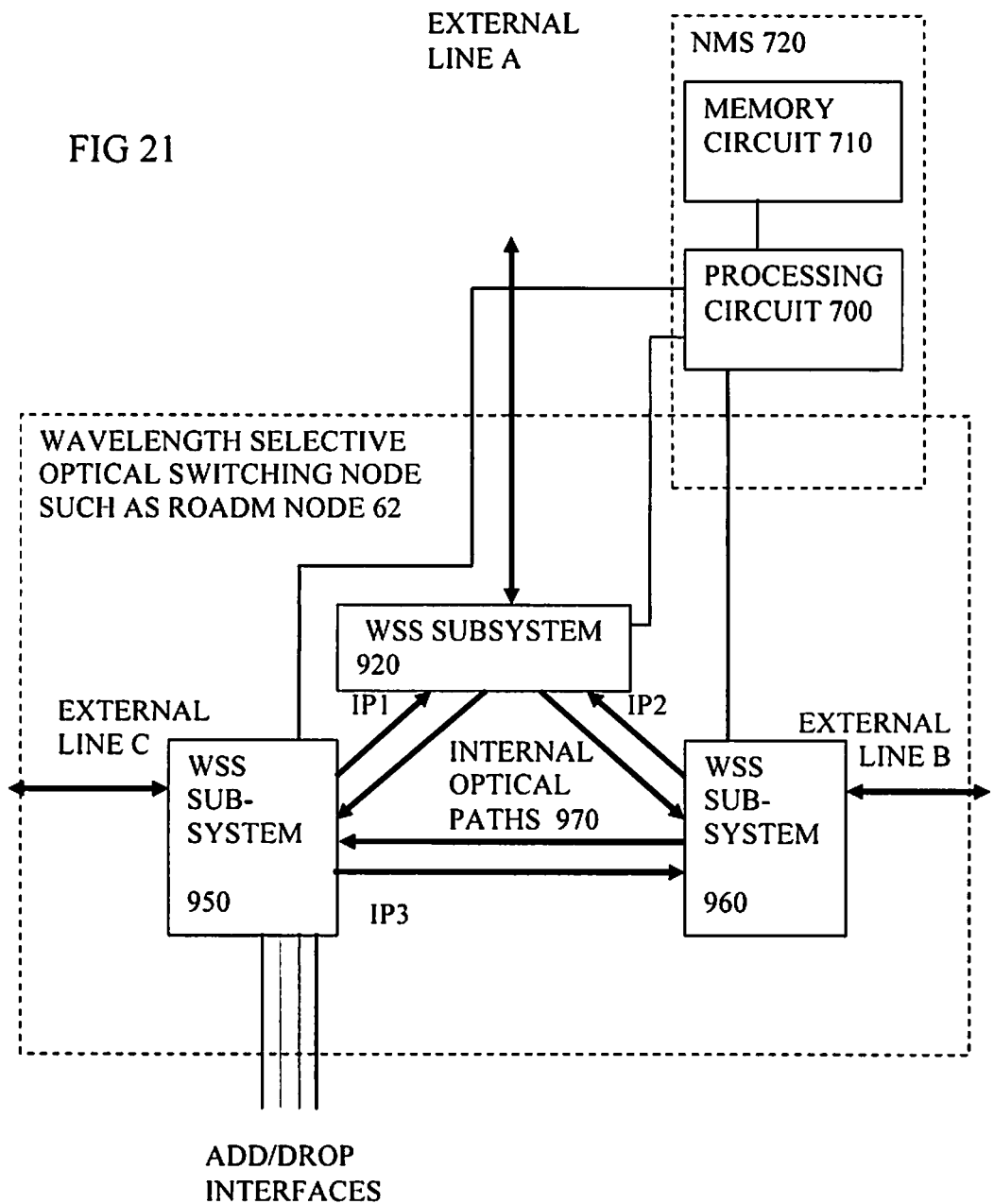
FIG. 21 shows a schematic view of apparatus incorporated in an NMS to control verification of configuration.

FIG. 19, Embodiment of Apparatus for Verification of Configuration

FIG. 19 shows an example of apparatus 705 for verifying the configuration. The apparatus may be located anywhere in principle, for example in the node, or in a network controller, or a centralised location for use with many nodes. The apparatus has a processing circuit 700 and memory circuit 710 for storing instructions for the processor circuit to execute. The processing circuit is coupled to receive detections of optical power from a WSS subsystem of a node, and is configured to identify which of the subsystems is coupled upstream of the first internal optical path and which of the internal ports of the downstream subsystem is coupled, based on detecting optical power distinctive of the upstream subsystem and carried to the downstream subsystem, the detecting comprising detecting the distinctive optical power by at least one of: detecting a power of wavelengths used for traffic, and detecting a power of optical noise when there is no traffic. The processing circuit is also configured to make a record of the identified configuration of which of the internal ports of the downstream subsystem is coupled to the identified upstream subsystem. This record can be stored locally or centrally and can be used by a node controller or by a network management system for example, to control routing of new traffic. The apparatus can optionally be configured to perform any of the methods described above. A benefit is that automated verification of the configuration can be carried out without the conventional dedicated optical wavelengths or dedicated optical hardware for inserting such additional wavelengths dedicated to discovery. Also the verification can be carried out without disrupting the traffic.

FIG. 20, Embodiment of Apparatus having Modules for Verification of Configuration FIG. 20 shows another example of apparatus for verifying the configuration. Compared to FIG. 19 this apparatus 705 has modules for carrying out corresponding functions. The modules can comprise for example hardware or software, processing circuits and associated memory, or other types of circuitry, and can be integrated to any amount, and boundaries between modules or how different functions are divided or combined into modules can be varied. Again the apparatus may be located anywhere in principle, for example in the node, or in a network controller, or a centralised location for use with many nodes. The apparatus has a module 740 coupled to receive detections of optical power from a WSS subsystem of a node, and for identifying which of the subsystems is coupled upstream of the first internal optical path and which of the internal ports of the downstream subsystem is coupled, based on detecting optical power distinctive of the upstream subsystem and carried to the downstream subsystem, the detecting comprising detecting the distinctive optical power by at least one of: detecting a power of wavelengths used for traffic, and detecting a power of optical noise when there is no traffic. A module 750 is provided for making a record of the identified configuration of which of the internal ports of the downstream subsystem is coupled to the identified upstream subsystem. This record can be stored locally or centrally and can be used by a node controller or by a network management system for example, to control routing of new traffic. The apparatus can optionally have modules for carrying out any other features of methods described above. Again a benefit is that automated verification of the configuration can be carried out without the conventional dedicated optical wavelengths or dedicated optical hardware for inserting such additional wavelengths dedicated to discovery. Also the verification can be carried out without disrupting the traffic.

FIG. 22 Embodiment Using NMS to Control Verification of Configuration

FIG. 22 shows a schematic view of some parts of a wavelength selective optical switching node 62 for an optical communications network suitable for embodiments, similar to that of FIG. 1 and corresponding reference numerals have been used as appropriate. In this case there is a controller for running the verification method using a processing circuit 700 and memory circuit 710 for storing instructions for the processor circuit to execute, and this controller is part of the NMS 720, rather than being local to the node. The NMS can be centralised or distributed, and the controller can be part of an element manager part of the NMS, and in principle can be located anywhere, providing there are sufficient communication links to the node. These links should be sufficient to receive results of detections of optical power at each of the WSS subsystems, and to send commands to control the optical power of outputs on the outward internal ports.

Concluding Remarks

The features described can work for both the widely used Broadcast & Select architecture as well as the increasingly used Route & Select architecture. They do not require additional hardware and can make use of the centralized knowledge of the node and the network offered by the NMS or the SDN Transport Controller. The method is applicable in a green field scenario (new ROADM node installation) or brown field (upgrade of an existing ROADM node). Some consequences or effects of the embodiments described are as follows:

Automatic and error free configuration and upgrade of ROADM nodes.
OPEX savings: speed up of node commissioning and upgrade.
Prevent mis-configurations due to manual error.
Seamless introduction of photonic switching layer for IP/DWDM (IP world is used to digital/automatic operations and does not want to see the complexity of the photonic layer).
Facilitate scalability of ROADM nodes.
Possible implementation as part of an IP/DWDM solution.
Compatible with existing ROADMs systems (no hardware modifications needed).
Other variations can be envisaged within the claims.

The invention claimed is:

1. A method of verifying a configuration of reconfigurable internal optical paths in a wavelength selective optical switching node having at least two wavelength selective switching (WSS) subsystems, each subsystem of the at least two WSS subsystems having at least two internal ports and being configured such that an internal optical path carries traffic from an internal port of an upstream subsystem of the at least two WSS subsystems to an internal port of a downstream subsystem of the at least two WSS subsystems, the method comprising:

identifying a configuration, comprising a particular upstream subsystem and a particular internal port of a particular downstream subsystem that are coupled to the internal optical path, based on detecting an optical signal distinctive of the particular upstream subsystem and carried to the particular downstream subsystem, the detecting comprising:

detecting a pattern of wavelengths used for traffic in a first direction, the pattern being distinctive of the particular upstream subsystem, and detecting a power of an optical noise source when there is no traffic in a second direction, the power of the optical noise source being distinctive of the particular upstream subsystem; and making a record of the identified configuration of the particular internal port of the particular downstream subsystem, wherein the particular internal port of the particular downstream subsystem is coupled to the particular upstream subsystem via the internal optical path, wherein the internal optical path is a bidirectional path between the particular upstream subsystem and the particular internal port of the particular downstream subsystem.

2. The method of claim 1, wherein identifying the configuration is based on detecting the pattern of wavelengths by at least one of: detecting a distinctive pattern of which wavelengths are in use and detecting a distinctive optical power modulation applied to enable the verification.

3. The method of claim 1, wherein detecting the power of the optical noise source is performed when no optical noise is being output from upstream subsystems other than the particular upstream subsystem.

4. The method of claim 1, further comprising configuring the particular upstream subsystem to broadcast the distinctive optical signal to more than one internal port of the particular upstream subsystem, wherein identifying the configuration is based on detecting at different ones of the particular downstream subsystem's internal ports.

5. The method of claim 1, further comprising configuring the particular upstream subsystem to route the distinctive optical signal to different ones of the particular upstream subsystem's internal ports for respective defined periods.

6. The method of claim 1, wherein identifying the configuration comprises comparing the detected distinctive optical signal to a known optical signal output by the particular upstream subsystem.

7. The method of claim 1, further comprising: if detecting the power of the optical noise source produces an ambiguity, causing an unambiguously identifiable optical signal to be output from the particular upstream subsystem over the internal optical path.

8. The method of claim 1, further comprising controlling nodes, upstream of the particular upstream subsystem, to route a temporarily unused wavelength to the particular downstream subsystem to provide a further distinctive optical signal.

9. The method of claim 1, further comprising controlling an optical amplifier at the particular upstream subsystem to provide the distinctive optical signal without including an additional dedicated optical wavelength.

10. The method of claim 1, further comprising using the identified configuration to identify an incorrect configuration.

11. The method of claim 1, wherein the method is carried out by a network management system.

12. An apparatus for verifying a configuration of reconfigurable internal optical paths in a wavelength selective optical switching node having at least two wavelength selective switching (WSS) subsystems, each subsystem of the at least two WSS subsystems having at least two internal ports and being configured such that an internal optical path carries traffic from an internal port of an upstream subsystem of the at least two WSS subsystems to an internal port of a downstream subsystem of the at least two WSS subsystems, the apparatus comprising:
  a processing circuit; and
  a memory circuit storing computer-executable instructions that, when executed by the processing circuit, configure the apparatus to:
    identify a configuration, comprising a particular upstream subsystem and a particular internal port of a particular downstream subsystem that are coupled to the internal optical path, based on detecting an optical signal distinctive of the particular upstream subsystem and carried to the particular downstream subsystem, the detecting comprising:
      detecting a pattern of wavelengths used for traffic in a first direction, the pattern being distinctive of the particular upstream subsystem, and
      detecting a power of an optical noise source when there is no traffic in a second direction, the power of the optical noise source being distinctive of the particular upstream subsystem, and
    make a record of the identified configuration of the particular internal port of the particular downstream subsystem, wherein the particular internal port of the particular downstream subsystem is coupled to the particular upstream subsystem via the internal optical path,
    wherein the internal optical path is a bidirectional path between the particular upstream subsystem and the particular internal port of the particular downstream subsystem.

13. The apparatus of claim 12, wherein execution of the instructions further configures the apparatus to identify the configuration based on detecting the pattern of wavelengths by at least one of: using an optical channel monitor to detect a distinctive pattern of which wavelengths are in use and using an optical power detector to detect a distinctive optical power modulation applied to enable the verification.

14. The apparatus of claim 12, wherein the particular upstream subsystem is configured to broadcast the distinctive optical signal to internal ports of the particular upstream subsystem, and wherein execution of the instructions further configures the apparatus to identify the configuration based on detecting at different ones of the particular downstream subsystem's internal ports.

15. The apparatus of claim 12, wherein execution of the instructions further configures the apparatus to control nodes, upstream of the particular upstream subsystem, to route the distinctive optical signal to different ones of the particular upstream subsystem's internal ports for respective defined periods.

16. The apparatus of claim 12, wherein execution of the instructions further configures the apparatus to, in the case of an ambiguity in detecting the power of the optical noise source, control the particular upstream subsystem to output an unambiguously identifiable optical signal over the internal optical path.

17. The apparatus of claim 12, wherein execution of the instructions further configures the apparatus to compare the detected distinctive optical signal to a known optical signal output by the particular upstream subsystem.

18. A network management system comprising the apparatus of claim 12.

19. A controller for a node comprising the apparatus of claim 12.

20. A non-transitory computer-readable medium storing computer-executable instructions that, when executed by a processing unit, configure an apparatus to perform operations comprising:
  identifying a configuration, comprising a particular upstream wavelength selective switching (WSS) subsystem and a particular internal port of a particular downstream WSS subsystem that are coupled to an internal optical path, based on detecting an optical signal distinctive of the particular upstream subsystem and carried to the particular downstream subsystem, the detecting comprising:
    detecting a pattern of wavelengths used for traffic in a first direction, the pattern being distinctive of the particular upstream subsystem, and
    detecting a power of an optical noise source when there is no traffic in a second direction, the power of the optical noise source being distinctive of the particular upstream subsystem; and
  making a record of the identified configuration of the particular internal port of the particular downstream subsystem, wherein the particular internal port of the particular downstream subsystem is coupled to the particular upstream subsystem via the internal optical path,
  wherein the internal optical path is a bidirectional path between the particular upstream subsystem and the particular internal port of the particular downstream subsystem.

* * * * *